United States Patent
Predtechenskiy et al.

(10) Patent No.: US 12,281,214 B2
(45) Date of Patent: Apr. 22, 2025

(54) ADDITIVE FOR RUBBER COMPOUNDS AND METHOD FOR PRODUCING SAME

(71) Applicant: MCD Technologies S.a r.l., Leudelange (LU)

(72) Inventors: Mikhail Rudolfovich Predtechenskiy, Novosibirsk (RU); Alexandr Alexandrovich Khasin, Bat Yam (IL); Ruslan Vladimirovich Karpunin, Kol'tsovo (RU); Andrey Yurievich Skuratov, Novosibirsk (RU); Ilya Anatolyevich Filippov, Novosibirsk (RU); Angelina Nikolaevna Anufrieva, Novosibirsk (RU); Vladimir Andreevich Kruch, Novosibirsk (RU)

(73) Assignee: MCD Technologies S.a. r.l., Leudelange (LU)

( * ) Notice: Subject to any disclaimer, the term of this patent is extended or adjusted under 35 U.S.C. 154(b) by 0 days.

(21) Appl. No.: 18/039,247

(22) PCT Filed: Feb. 21, 2022

(86) PCT No.: PCT/RU2022/050055
§ 371 (c)(1),
(2) Date: May 28, 2023

(87) PCT Pub. No.: WO2022/186728
PCT Pub. Date: Sep. 9, 2022

(65) Prior Publication Data
US 2024/0002631 A1 Jan. 4, 2024

(30) Foreign Application Priority Data
Mar. 5, 2021 (RU) ................. 2021105732

(51) Int. Cl.
*C08K 3/04* (2006.01)
*C08J 3/20* (2006.01)
(52) U.S. Cl.
CPC .............. *C08K 3/041* (2017.05); *C08J 3/203* (2013.01); *C08J 2309/00* (2013.01); *C08J 2315/00* (2013.01); *C08K 2201/001* (2013.01)

(58) Field of Classification Search
CPC ...................................................... C08K 3/041
See application file for complete search history.

(56) References Cited

U.S. PATENT DOCUMENTS

| | | | | |
|---|---|---|---|---|
| 3,925,272 | A * | 12/1975 | Ibata | C08L 21/00 524/925 |
| 2010/0059720 | A1* | 3/2010 | Berkei | C01B 32/174 252/511 |
| 2016/0020466 | A1 | 1/2016 | Ulbrich et al. | |
| 2016/0168338 | A1* | 6/2016 | Soisson | C08L 25/16 524/445 |
| 2016/0251534 | A1* | 9/2016 | Burlett | C08J 3/223 524/574 |
| 2018/0334521 | A1* | 11/2018 | Gruendken | C08F 212/12 |
| 2019/0013111 | A1* | 1/2019 | Yonekura | H01B 1/02 |
| 2023/0378471 | A1* | 11/2023 | Fujiwara | H01M 4/13 |

FOREIGN PATENT DOCUMENTS

| | | |
|---|---|---|
| CN | 1673261 A | 9/2005 |
| CN | 110229393 A | 9/2019 |
| EP | 2607407 A1 | 6/2013 |

OTHER PUBLICATIONS

Search Report in PCT/RU2022/050055 dated Jun. 9, 2022.

* cited by examiner

*Primary Examiner* — William D Young
(74) *Attorney, Agent, or Firm* — Bardmesser Law Group

(57) ABSTRACT

The invention relates to additives for enhancing the electrical conductivity and physical and mechanical properties of rubber compounds, including, inter alia, the elastic modulus, tensile strength, tear resistance and abrasion resistance of composite elastomer-based materials (rubbers), and to composite elastomer-based materials (rubbers). The invention proposes an additive containing from 1 to 20 wt % carbon nanotubes, from 3 to 90 wt % high-viscosity organic rubber, and from 8 to 95 wt % low-molecular-weight organic dispersion medium. The present invention also proposes a method for producing the additive.

13 Claims, No Drawings

ADDITIVE FOR RUBBER COMPOUNDS AND METHOD FOR PRODUCING SAME

BACKGROUND OF THE INVENTION

Field of the Invention

The invention relates to additives for enhancing the electrical conductivity and physical and mechanical properties of rubber compounds, including, inter alia, elastic modulus, tensile strength, tear resistance, and abrasion resistance, for composite elastomer-based materials (rubbers), and to composite elastomer-based materials (rubbers).

Background of the Related Art

Many fillers of various chemical nature and morphology are known, which, upon adding to rubber compounds, enhance the mechanical properties of rubber, i.e., its elastic modulus, tensile strength, tear resistance, etc. "Rubber compound" here refers to a mixture based on rubber or more than one rubbers prior to its curing. "Rubber" here refers to the product of curing a rubber compound. Some of these fillers increase electrical conductivity of rubber, the most widespread of such fillers are various types of carbon black. A disadvantage of using carbon black is that large amount (such as more than 30 parts per 100 parts of rubber) of carbon black is needed to provide the required electrical conductivity. Adding such significant amounts of carbon black has a detrimental effect on certain physical and mechanical properties, such as abrasion resistance. Carbon nanotubes are a promising filler capable of enhancing electrical conductivity and physical and mechanical properties of rubber when added in relatively small amounts, due to a large length-to-diameter ratio typical for their morphology. Among carbon nanotubes, nanotubes with the lowest number of walls—double-walled or single-walled carbon nanotubes—are the most preferable as they have maximum length-to-diameter ratio and maximum specific surface area. Experimental data is available (e.g., in patent RU 2731635 C, IPC: B60C11/00) showing that adding even rather small amounts of single-walled carbon nanotubes into rubber, such as 0.3 wt %, allows to obtain rubber volume resistivity of less than $10^4$ Ohm·m.

Adding carbon nanotubes, especially single-walled or double-walled carbon nanotubes, into a composite material poses a serious technical challenge. In order to achieve the technical result, i.e., enhance electrical conductivity and physical and mechanical properties of rubber, a uniform distribution of carbon nanotubes over the bulk of a rubber compound should be provided along with ensuring dispersion of entangled agglomerates of carbon nanotubes to the smallest possible size, preferably down to bundles of carbon nanotubes, while neither damaging nor destroying the nanotubes. Adding carbon nanotubes to a composite material is quite challenging for any material, while for rubber compounds it is further complicated by the combination of viscoelastic properties of the rubber polymer and its high viscosity.

One of approaches disclosed for dispersion of nanosized additives in rubber-containing compounds makes use of preliminary dispersing in aqueous rubber dispersions, i.e., latexes. According to the description in EP 2436720 B1, Jul. 23, 2014, IPC: C08J3/00, C08J3/215, C08J3/22, carbon nanotubes are first dispersed in an aqueous phase using ultrasound, then polymer latex is added, and then coagulation is performed. The resultant masterbatch is subjected to further treatment (drying). A disadvantage of this method is an appreciable amount of dispersant remaining in the resultant masterbatch. It has a detrimental effect on rubber (such as reducing its elasticity and/or strength) and parts made from it. Furthermore, upon implementation of the production method disclosed in EP 2436720 B1, a large amount of water remains in the masterbatch after coagulation, which requires cost-intensive drying.

Another publication [RU 2619782 C2, May 18, 2017, IPC: C01 B31/00, C08J3/22, C08J3/26, B82Y30/00, B29B7/34, B29B7/56] discloses a method for preparing a masterbatch comprising carbon nanotubes in high-viscosity rubbers, the method comprising mixing the nanotubes with at least one rubber latex, heating up to 100° C. to 200° C., and, after allowing water to evaporate, dispersing on a three roll mill, wherein single-walled, multi-walled or double-walled carbon nanotubes are used as the nanoparticles, wherein the masterbatch comprising carbon nanotubes is moved along the center roll into the gap between the center roll and the delivery rolls, then dispersed there, and then removed from the delivery roll, wherein the gap size is 5 to 120 μm, and, upon each passage through the gap, the gap size is reduced by a factor of ≥1.5. Water evaporation is preferably performed in a mixing unit, such as an extruder, an internal mixer, or a press mixer. The masterbatch produced according to RU 2619782C2 provides for dispersion of carbon nanotubes down to agglomerate size of less than 10 μm in a high-viscosity rubber latex with water content of less than 10 wt %, preferably less than 1 wt %. A disadvantage of this method is complexity, duration, and energy consumption of the evaporation stage in the course of mixing—the provided examples require more than 20 minutes of mixing in an internal mixer. Such prolonged treatment in a rubber mixer may result in substantial damage both to rubber and to carbon nanotubes. Due to high viscosity of rubber, a treatment of mixtures of carbon nanotubes with latexes after water removal on a three roll mill also requires a high torque, therefore conventional three roll mills cannot be used for this purpose, and specialized equipment is required.

Another approach to preliminary dispersion of nanosized additives in rubber comprising compounds is based on preliminary dispersion of carbon nanotubes in a certain liquid dispersion medium with low elasticity. Such dispersion is more efficient than dispersion in a high-viscosity and viscoelastic rubber or in its latex. On the other hand, mixing of a composite material with an additive, which is a dispersion system comprising nanotubes in this liquid dispersion medium, is more efficient than with a powder of non-dispersed carbon nanotubes and provides a more uniform distribution of nanotubes in the form of individual nanotubes or their agglomerates of small size. The dispersion of carbon nanotubes in such a dispersion medium can be achieved with a wide range of techniques, including treatment with ultrasound, bead mills, high pressure dispersers, three roll mills, and other known methods for dispersion and mixing. However, an obvious disadvantage of using CNT dispersions in liquid media is introducing a significant amount of the dispersion medium into the composite material.

This disadvantage had been overcome in publication RU 2654959 C2, May 23, 2018, IPC: C01 B32/174, B82B1/00, B82B3/00, B82Y40/00, that provides a superconcentrate of carbon nanotubes, which is a dispersion system comprising carbon nanotubes as the dispersed phase and a dispersion medium, wherein the dispersion system is obtained by mixing carbon nanotubes and the dispersion medium, wherein the dispersion system comprises at least 2 wt % carbon nanotubes, and it is obtained by mechanically treating a mixture of the carbon nanotubes and the dispersion medium to the maximum size of carbon nanotube agglomerates in it not exceeding 50 μm, wherein the dispersion medium is a substance having a contact angle relative to highly oriented pyrolytic graphite of 120° or less.

The use of such a "superconcentrate," i.e., a highly concentrated CNT dispersion, allows to decrease the amount of dispersion medium to be introduced down to a relatively low amount (less than 49 the mass of CNT to be introduced). If one of the components of the composite material (such as plasticizer or epoxy system reagent, or other component) is used, this allows adding a substantial, i.e., up to 1 wt % and higher, amount of carbon nanotubes pre-dispersed in the superconcentrate to the composite material without the need to remove the dispersion medium from the composite material.

For rubber compounds, a method is known to prepare a masterbatch, comprising carbon nanotubes, in liquid rubber according to EP 2607407 B1, Aug. 20, 2014, IPC: C08J3/22, C08K3/04, C08J5/00, C08J3/20, C08L9/02, C08L21/00, by dispersing on a three roll mill, which has been adopted as the prototype in the present invention. The method of the cited publication allows to achieve a small size of carbon nanotube agglomerates in the masterbatch by dispersing 5 to 50 wt % carbon nanotubes in a dispersion medium comprising liquid rubber with a mass average molecular weight (MW) from 500 g/mol to 200 kg/mol (preferably 500 g/mol to 100 kg/mol, most preferably 500 g/mol to 20 kg/mol).

The common feature of the superconcentrate of RU 2654959 C2 and the method for preparing a masterbatch of EP 2607407 B1 is that the primary technical result of the cited inventions is a good dispersion of carbon nanotubes in the superconcentrate and the masterbatch: the absence of large agglomerates of carbon nanotubes larger than 50 μm in the superconcentrate of RU 2654959 C2, while EP 2607407 B1 mentions the absence of agglomerates larger than 130 μm, preferably larger than 50 μm, more preferably larger than 10 μm, in the masterbatch. A common disadvantage of the superconcentrate of RU 2654959 C2 and the masterbatch of EP 2607407 B1 is that, despite the absence of large agglomerates of carbon nanotubes in the superconcentrate or the masterbatch, their addition to a composite material based on a high-viscosity viscoelastic component, such as rubber, causes reagglomeration of carbon nanotubes, and thus a homogeneous distribution and good dispersion of carbon nanotubes in the final composite material are not achieved. The processes of carbon nanotube reagglomeration are more pronounced for double-walled and single-walled carbon nanotubes that are capable of spontaneously bundling under the effect of van der Waals forces (π-π interaction). The disclosure and examples of EP 2607407 B1 are limited to masterbatches comprising multi-walled carbon nanotubes, therefore the inventors did not find this disadvantage of the method they suggested, which becomes apparent when using single-walled carbon nanotubes.

There are two options for the dispersion medium for the superconcentrate or the masterbatch: (1) a dispersion medium soluble in one of the main components of the composite material (such as in rubber), or (2) a dispersion medium insoluble in the main components of the composite material.

(1) When using a dispersion medium soluble in one of the main components of the composite material, in the process of mixing the superconcentrate of RU 2654959 C2 or the masterbatch of EP 2607407 B1 with a rubber compound comprising a high-viscosity rubber, the dispersion medium is dissolved in the rubber compound many times faster than the superconcentrate or the masterbatch is mixed with the rubber compound, which results in absorption of the dispersion medium into the rubber compound accompanied by formation of large agglomerates from carbon nanotubes. As a result, the carbon nanotubes in the composite material, while being well-distributed, are poorly dispersed.

(2) When using a dispersion medium insoluble in one of the main components of the composite material, in the process of mixing the superconcentrate of RU 2654959 C2 and EP 2607407 B1 with a composition comprising a high-viscosity viscoelastic component, the low-viscosity (in comparison to rubber) superconcentrate or masterbatch behave like a lubricant, which results in reduced quality of mixing of the rubber compound, and ultimately an emulsion of the superconcentrate or masterbatch in the rubber compound is formed, leading to insufficient distribution of carbon nanotubes in the rubber compound. As the examples provided below demonstrate, addition of the superconcentrate of RU 2654959 C2 or the masterbatch of EP 2607407 B1 to rubber compounds has a low effect of introduced carbon nanotubes on physical and mechanical properties and electrical conductivity, and even deteriorate physical and mechanical properties in certain cases.

A significant disadvantage of the method for preparing the masterbatch of EP 2607407 B1 is that, upon subsequent addition of such a masterbatch to a rubber compound, a large amount of liquid rubber is introduced into the rubber compound together with carbon nanotubes, i.e., a relatively low-molecular-weight rubber. For example, if the average molecular weight (MW) of a styrene butadiene liquid rubber is 1000 Da, this means that monomer units of styrene and butadiene are present in a rubber molecule on average only 6 times each, while there are only 5 or less of each in a significant fraction of rubber molecules. Adding a significant amount of rubber oligomers modifies the kinetics of the curing process, the post-curing structure of the polymer, and has a detrimental effect on physical and mechanical properties of rubber. This disadvantage is an inherent feature of masterbatches produced by the method of EP 2607407 B1, which is caused by using liquid rubber as the dispersion medium rather than, for example, plasticizing mineral oils or other low-molecular-weight solvents which, when introduced into the rubber, do not modify the molecular-weight distribution of the rubber polymer.

As follows from the above, there is a technical problem of providing an additive to rubber compounds, the additive comprising carbon nanotubes and enhancing both electrical conductivity and physical and mechanical properties of rubber; providing a method for producing an additive to rubber compounds, the additive comprising carbon nanotubes and enhancing both electrical conductivity and physical and mechanical properties of rubber; providing a method for producing rubber with enhanced electrical conductivity and physical and mechanical properties; and providing rubber with enhanced electrical conductivity and physical and mechanical properties, the rubber comprising carbon nanotubes.

SUMMARY OF THE INVENTION

The present invention, in one aspect, provides an additive to rubber compounds for enhancing electrical conductivity and physical and mechanical properties of rubber, the additive comprising carbon nanotubes, wherein the additive comprises 1 to 20 wt % carbon nanotubes, 3 to 90 wt % high-viscosity organic rubber (R), and 8 to 95 wt % low-molecular-weight organic dispersion medium capable of dissolving the high-viscosity organic rubber (R).

The presence of high-viscosity rubber in the additive prevents carbon nanotube agglomeration in the course of dissolution of the dispersion medium in a rubber compound when mixing the additive and the rubber compound.

The technical result of using such an additive to rubber compounds is enhanced electrical conductivity of rubber, i.e., reduced rubber volume resistivity and enhanced physical and mechanical properties, including rubber elastic moduli as per standard [ISO 37:2017. *Rubber, vulcanized or thermoplastic—Determination of tensile stress-strain properties*], rubber tear resistance as per standard [ISO 34:1979. *Rubber, vulcanized—Determination of tear strength (trouser, angle and crescent test pieces)*], and rubber hardness as per standard [ISO 7619-1:2010 *Rubber, vulcanized or thermoplastic—Determination of indentation hardness—Part 1: Durometer method (Shore hardness)*].

An additional technical result achieved by using such an additive may be, but not in every case of its usage, increased rubber tensile strength, increased rubber thermal conductivity, increased rubber abrasion resistance, enhanced rubber dynamical properties (including increased storage modulus, increased loss factor (mechanical loss tangent) of rubber at 0° C. and at 20° C.). In comparison to other electrically conductive additives, such as carbon black, an additional technical result of using the provided additive for rubber compounds may be a lighter color of rubber, a potential of producing colored rubber upon introducing suitable pigments into it, a potential of producing rubber not leaving black marks on surfaces it contacts.

"High-viscosity organic rubber" refers to synthetic or natural, saturated or unsaturated rubbers with a Mooney viscosity $ML_{(1+4)}$ of over 20 at 100° C. The mass average molecular weight ($M_w$) of such rubbers may reach 1000 kg/mol (1 million Dalton) and more. Such rubbers are sometimes referred to as "solid" ones, not to imply their crystallinity, but rather to contrast them to "liquid rubbers," i.e., oligomers with a lower average molecular weight and lower viscosity. As examples in this invention demonstrate, it is the presence of high-viscosity or "solid" organic rubbers in the additive that ensures formation of a significant amount of bound rubber in it and subsequently promotes a good distribution and dispersion of carbon nanotubes in the rubber compound. Synthetic or natural, saturated or unsaturated rubbers can be used as the high-viscosity organic rubber (R), such as, but not limited to, natural or synthetic isoprene rubbers, styrene butadiene rubbers, nitrile butadiene rubbers, hydrogenated nitrile butadiene rubbers, butadiene rubbers, butyl rubbers, halobutyl rubbers, ethylene propylene rubbers, ethylene propylene diene rubbers containing ethylene norbornene or 1,4-hexadiene or dicyclopentadiene as the third monomer, propylene oxide rubbers, acrylate rubbers, carboxylate rubbers, chloroprene rubbers, fluoroelastomers, polysulfide rubbers, epichlorohydrin rubbers, urethane rubbers, chlorosulfonated rubbers, or combinations thereof. An oil-extended rubber can be used as the high-viscosity rubber (R), i.e., a synthetic rubber in which organic plasticizers (oils) are introduced at a production stage. In contrast to high-viscosity "solid" organic rubbers, the presence of low-viscosity "liquid" rubbers in the additive is undesirable and should be preferably avoided for reasons described above.

The high-viscosity organic rubber (R) preferably has viscosity $ML_{(1+4)}$ of more than 20 Mooney units (MU) at 100° C. (determination of rubber viscosity should be made following Russian standard GOST R 54552-2011 *Rubbers and Rubber Compounds. Determination of Viscosity, Stress Relaxation and Pre-Vulcanization Characteristics by Mooney Viscometer*, or equivalent standard ASTM D 1646-2015); for certain applications, the high-viscosity organic rubber preferably has viscosity $ML_{(1+4)}$ of more than 40 Mooney units at 100° C.; for other applications, the high-viscosity organic rubber preferably has viscosity $ML_{(1+4)}$ of more than 60 Mooney units at 100° C.

"Low-molecular-weight dispersion medium" refers to a liquid low-molecular-weight organic compound with a molecular weight of less than 900 g/mol or a solution of more than one low-molecular-weight organic compounds, i.e., compounds with a molecular weight of less than 900 g/mol. From the viewpoint of processability of both production and subsequent usage of the additive, the flash point of the dispersion medium is preferably more than 100° C., while dynamic viscosity of the dispersion medium at a temperature of not more than 100° C. is preferably less than 0.1 Pa·s.

The dispersion medium can be, for example, a liquid phase comprising mineral petrol oils, such as naphthene oils, paraffin oils, or aromatic oils. For certain applications, it is preferable that the low-molecular-weight dispersion medium is a mineral oil similar in composition to oils used for extension of organic synthetic rubber (such as aromatic oil of TDAE class that is used for extension of styrene butadiene rubber) or other mineral oils. For such applications, the low-molecular-weight dispersion medium is preferably a mineral petrol oil with a flash point of more than 200° C. and a kinematic viscosity of less than 1 St at 100° C.

For certain applications, the low-molecular-weight dispersion medium is preferably a polar solvent with a relative dielectric permittivity of more than 5 at 25° C. The high polarity of the dispersion medium in certain cases promotes a good dispersion of carbon nanotubes. Most preferably, the relative dielectric permittivity of the dispersion medium is above 40 at 25° C.

For example, the dispersion medium can comprise, but not limited to, more than 10 wt % propylene carbonate, or 1,2-butylene carbonate, or 2,3-butylene carbonate, or a mixture thereof. In other applications, N,N-dimethyllactamide and/or N-formylmorpholine, and/or other polar organic compounds can be used as components of the dispersion medium.

It should be noted that the technical result can also be achieved using a less polar dispersion medium. For certain applications, the dispersion medium preferably comprises, but not limited to, at least 20 wt % one ester or of a mixture of more than one esters of aliphatic alcohols with acids selected from phthalic acid, or terephthalic acid, or sebacic acid, or adipic acid, or cyclohexanedicarboxylic acid, such as dibutyl phthalate, dioctyl sebacate, dioctyl adipate, diisononyl cyclohexanoate. In certain other cases, a polar dispersion medium is undesirable, as it can have a detrimental effect on interaction of other components of the rubber compound.

"Carbon nanotubes" refers to cylindrical carbon nanostructures with a diameter of 0.7 to 50 nm consisting of one or more carbon (graphene) layers. Single-walled carbon nanotubes, and/or double-walled carbon nanotubes, and/or multi-walled carbon nanotubes can be used in the rubber compound of this invention. The surface of the carbon nanotubes can be modified with functional groups, such as carboxy or hydroxy, or organic groups, such as those containing one or more amino and/or sulfoxy and/or epoxy and/or peroxy and/or other groups, but not limited to the listed examples. The structure of the carbon nanotubes can contain heteroatoms, for example, nitrogen atoms, etc. Single-walled carbon nanotubes with a diameter of more than 0.7 and less than 6 nm can be used as the carbon nanotubes.

The single-walled and double-walled nanotubes are known to be capable of bundling due to van der Waals forces (π-π interaction). As nanotubes are bundled, both the diameter and the length of the bundle increase, and the length/diameter ratio of the nanotube bundle grows as the number of nanotubes in the bundle increases. It is also known that the greater the length/diameter ratio of the particles in the conductive filler, the lower the lowest concentration of the conductive filler ensuring the existence of a connected conductive cluster (percolation threshold). Therefore, the number of nanotubes in the bundle, and, therefore, the diameters of nanotube bundles in the final rubber compound are preferably as large as possible, for example, more than 300 nm, preferably more than 1 μm, preferably more than 3 μm, to achieve a lower percolation threshold.

On the other hand, the presence of multiple thin nanotube bundles in the material is also desirable to ensure the homogeneity of the material, preserve its physical and mechanical properties (including strength and wear resistance), and reduce the contact resistance of the material. Therefore, an additive is preferred, wherein the nanotubes are combined into bundles with a wide bundle diameter distribution, such as 10 nm to 500 nm, or more preferably 5 nm to 1 μm, or more preferably 3 nm to 3 μm.

The multi-walled nanotubes are usually combined into entangled agglomerates, but they are not capable to combine into bundles. The entangled nanotube agglomerates in the material are undesired. Preferably, more than 25 wt % carbon nanotubes in the additive are double-walled or single-walled, most preferably more than 50 wt % carbon nanotubes in it are single-walled. A characteristic feature of single-walled carbon nanotubes setting them apart from other carbon allotropes is a high intensity of the G band with a maximum of about 1580 $cm^{-1}$ in comparison to the D band of about 1330 $cm^{-1}$ in Raman spectrum. For this reason, the higher the ratio of intensities of the G/D bands in Raman spectrum, the better. The carbon nanotubes in the additive are preferably characterized by the ratio of intensities of the G/D bands in Raman spectrum of more than 10 at 532 nm. More preferably, the carbon nanotubes in the additive are characterized by the ratio of intensities of the G/D bands in Raman spectrum of more than 40 at 532 nm. Most preferably, the carbon nanotubes in the additive are characterized by the ratio of intensities of the G/D bands in Raman spectrum of more than 60 at 532 nm. However, it should be noted that, in certain applications, the technical result can also be achieved at a low content of single-walled carbon nanotubes in the additives, and therefore at a low ratio of intensities of the G/D bands.

Mixing of the additive of the present invention with a rubber compound results in formation of a uniform network of well-dispersed carbon nanotubes and their bundles in the rubber compound, which causes increased rubber electrical conductivity, elastic moduli, tear resistance, and hardness. Achieving this technical result requires not only the carbon nanotubes to be dispersed in the dispersion medium compatible with the target rubber compound and the carbon nanotube concentrate to contain a high-viscosity rubber, but also a high-viscosity rubber to be present in the additive. This prevents re-agglomeration of carbon nanotubes in the course of mixing the rubber compound, preserves a high degree of dispersion of carbon nanotubes, and ensures their uniform distribution in the final composite material. A fraction of the high-viscosity rubber in the additive is preferably bound to carbon nanotubes forming a layer of bound rubber around the carbon nanotubes. A conventional term "bound rubber" (BdR) used in the rubber technology hereinafter refers to the rubber fraction not extractable from an uncured, filled rubber mixture in a suitable solvent, i.e., in a solvent with unlimited solubility of rubber (see, e.g., J. L. Leblanc, *Elastomer-Filler Interactions and the Rheology of Filled Rubber Compounds*, Journal of Applied Polymer Science, Vol. 78, 1541-1550 (2000)).

The residue (tails) after extraction of rubber for a prolonged period of time (such as more than 7 days) from the additive in a large amount (such as more than 100-fold excess) of an organic solvent forming an unlimited series of solutions with the organic rubber (R) preferably comprises more than 20 wt % rubber, i.e., the additive preferably comprises bound rubber, and the ratio of the mass fractions of carbon nanotubes and rubber bound to them is preferably less than 4. The molecules of polymer in the bound rubber can be chemically bonded to functional groups on the surface of carbon nanotubes, however, this is not mandatory, and rubber interaction with the filler, in particular with carbon nanotubes, can be due to van der Waals forces.

In addition to carbon nanotubes, dispersion medium, and rubber, the additive of the present invention can contain other components, such as particles of metals of groups 8-11 of the periodic table, for example, iron, cobalt, nickel, ruthenium, rhodium, palladium, iridium, platinum, copper, silver, gold, or their alloys, but not limited to the listed examples. The metal particles can be introduced into the additive together with carbon nanotubes as impurities due to the method for producing carbon nanotubes. The metal particles or other components can be deliberately introduced to the additive to modify one or more properties of the rubber compound.

Variation of the content of carbon nanotubes, the rubber content, and the nature of the dispersion medium can alter certain physical and chemical properties of the additive, such as its viscosity and electrical conductivity. In certain applications, to ensure better mixing with the rubber compound, the additive preferably should not significantly differ in viscosity from the rubber compound, e.g., should be in the range of 5 to 90 Mooney units at a temperature of 100° C. In certain other applications, the additive may be less viscous. In this case, its viscosity is preferably characterized by the needle penetration depth at 25° C. over 5 seconds at the defined load of 100 g according to Russian standard GOST-11501-78 (or equivalent standards DIN EN1426: 2015, ASTM D5). This property, besides characterizing the viscosity of the additive, is also illustrative of the homogeneity of dispersion and distribution of carbon nanotubes in the dispersion medium: in case of inhomogeneous additive, the needle penetration depth increases significantly. The needle penetration depth is preferably less than 20 mm (200 penetration units equal to 0.1 mm), most preferably less than 15 mm, for certain applications, the penetration depth is preferably less than 10 mm (100 penetration units equal to 0.1 mm).

Additionally, for certain applications, to ensure a better effect on the electrical conductivity of the final rubber compound, the additive preferably should have electrical conductivity of at least 0.5 S/m, i.e., its volume resistivity at 25° C. is not higher than 2 Ohm-m, while in some other applications, a lower electrical conductivity of the additive is sufficient.

The present invention also provides a method for producing the additive defined above, wherein the method comprises the following sequential stages: stage (I)—dissolving the high-viscosity rubber (R) in the dispersion medium and stage (II)—dispersing carbon nanotubes in the solution of stage (I). The solution of stage (I) can be a true solution or a colloid solution of rubber in the dispersion medium. Even in the case of producing a true rubber solution in the dispersion medium at stage (I), rubber interacts with carbon nanotubes after stage (II) to form a phase of bound rubber that is no longer soluble neither in the dispersion medium, nor upon extraction in organic solvents. The amount of this phase is preferably more than 25 wt % of the amount of carbon nanotubes in the additive. Carbon nanotubes can be dispersed in the solution of rubber in the dispersion medium by using one of the known methods for slurry dispersion and homogenization, including, but not limited to, ball mills, planetary mills, twin-screw homogenizers, rotor-stator homogenizers, three roll mills, roller mills with 4 or more rolls, internal rubber mixers with various rotor geometries, two roll rubber mills.

Since carbon nanotubes are a powder potentially posing a hazard to personnel and equipment, an additional stage of preliminary wetting and mixing of carbon nanotubes in the dispersion medium, or in one of the components of the dispersion medium, or in rubber solution in the dispersion medium is preferably performed between stages (I) and (II). This preliminary wetting and mixing can be performed in any known type of mixer, including, but not limited to, single-screw or twin-screw mixers, planetary mixers, kneaders, overhead stirrers with various impeller geometries, and rotary mixers. The quality of mixing at the stage of preliminary wetting and mixing does not play a defining role, as the main purpose of this process stage is wetting carbon nanotubes, easy dosing, and lack of dust upon subsequent dispersion at stage (II).

In certain cases, it is expedient to further include, after stage (II), the stage of mixing the produced paste, comprising carbon nanotubes, a dispersion medium, and a high-viscosity organic rubber (R), with a high-viscosity organic rubber (R2). The high-viscosity organic rubber (R2) may differ in its chemical nature and physical and chemical properties from the high-viscosity organic rubber (R), but the same rubber (R) may also be used as the rubber (R2). The resultant mixture can also be used as an additive for a rubber compound for enhancing electrical conductivity and physical and mechanical properties. The ratio of the weight of rubber (R2) to the weight of slurry after stage (II) is preferably less than or equal to 5. Additional mixing of the slurry, comprising carbon nanotubes, a dispersion medium, and a high-viscosity organic rubber (R), with the high-viscosity organic rubber (R2) can be performed using any known equipment for rubber mixing, such as an internal mixer with tangential rotors, or an internal mixer with intermeshing rotors, or two roll rubber mills, but not limited to the listed examples.

The present invention also provides a method for producing rubber with enhanced electrical conductivity and physical and mechanical properties, wherein the method comprises the stage of adding the additive comprising carbon nanotubes defined above into a rubber compound. "Rubber compound" refers to a mixture based on rubber or more than one rubbers prior to its curing. Adding the additive into the rubber compound can be performed as a separate process stage or combined with adding a filler and/or a plasticizer, and/or an antioxidant, and/or a silane coupling agent, and/or a curing agent, and/or a cure accelerator, and/or a cure retarder, and/or a stabilizer, and/or a dye, and/or a pigment to the rubber mixture, but not limited to the listed examples. The stage of adding the additive comprising carbon nanotubes into the rubber compound can be performed by any known method of mixing rubber mixtures, including, but not limited to, internal mixers with various geometries of chambers and rotors, open mills (two roll mills or rubber mixing rolls), twin screw mixers, extruders, etc., as well as in two- or multi-stage processes using various combinations of mixing methods. For certain applications, in the preferable method for producing rubber, the stage of adding the additive into the rubber compound is performed in an internal mixer. For certain other applications, in the preferable method for producing rubber, the stage of adding the additive to the rubber compound is performed in a two roll rubber mill. Mixing can be performed at higher temperatures. After mixing and forming into a suitable shape, the rubber compound can be subjected to curing by one of the known methods to produce rubber.

The present invention also provides rubber with enhanced electrical conductivity and physical and mechanical properties and comprising nanotubes, wherein the rubber comprises 0.01 to 1 wt % carbon nanotubes and has been produced by any of the methods as defined above using the additive comprising carbon nanotubes defined above.

The invention is illustrated by the following Examples and Tables that are provided for better understanding of the essence of the invention, but the invention is not limited by the provided Examples.

It is to be understood that both the foregoing general description and the following detailed description are exemplary and explanatory and are intended to provide further explanation of the invention as claimed.

BRIEF DESCRIPTION OF THE TABLES

Table 1

[Table 1] shows the components of additives of Examples 1-34, properties of TUBALL™ single-walled carbon nanotubes (SWCNT) used for their production, properties of the dispersion medium and high-viscosity rubber used for their production, and the ratio of the mass fraction of carbon nanotubes to the mass fraction of rubber bound to them.

Table 2

[Table 2] shows the data on viscosity and electrical conductivity of the additives of Examples 1-34.

Table 3

[Table 3] shows the components of the additives of Examples 35-41 and properties of carbon nanotubes used for their production.

Table 4

[Table 4] shows the components of the additives of Examples 42-45.

Table 5

[Table 5] shows the components of the rubber compounds of Example 46 based on EPDM rubber without carbon black using the additives of Examples 5-9, and properties of rubbers after curing.

Table 6

[Table 6] shows the components of the rubber compounds of Example 46 based on EPDM rubber without carbon black using the additives of Examples 10-14, and properties of rubbers after curing.

Table 7

[Table 7] shows the components of the rubber compounds of Example 46 based on EPDM rubber without carbon black using the additive of Example 9, and properties of rubbers after curing.

Table 8

[Table 8] shows the components of the rubber compounds of Example 47 based on EPDM rubber without carbon black using the additives of Examples 35-38, and properties of rubbers after curing.

Table 9

[Table 9] shows the components of the rubber compounds of Example 48 based on EPDM rubber with carbon black N550, an electrically conductive filler, or electrically conductive carbon powder Vulcan XC-72, using the additive of Example 9.

Table 10

[Table 10] shows the components of the rubber compounds of Example 49 based on colored (non-black) electrically conductive rubber mixtures based on EPDM rubber using the additives of Examples 9 and 42, and properties of rubbers after curing.

Table 11

[Table 11] shows the components of the rubber compounds of Example 50 based on a mixture of natural rubber and butadiene rubber using the additives of Examples 9, 15-17 and 43-44, and properties of rubbers after curing.

Table 12

[Table 12] shows the components of the rubber compounds of Example 51 based on a mixture of natural rubber and butadiene rubber without an oil plasticizer using the additives of Examples 16, 17 and 25, and properties of rubbers after curing.

Table 13

[Table 13] shows the components of the rubber compounds of Example 52 based on nitrile butadiene rubber filled with carbon black using the additives of Examples 18-20, 25-26 and 44, and properties of rubbers after curing.

Table 14

[Table 14] shows the components of the rubber compounds of Example 53 based on nitrile butadiene rubber filled with silicon dioxide using the additives of Examples 21-23, 25, 29, and 31 and properties of rubbers after curing.

Table 15

[Table 15] shows the components of the rubber compounds of Example 53 based on nitrile butadiene rubber filled with silicon dioxide using the additives of Examples 32-34 and 39-41, and properties of rubbers after curing.

Table 16

[Table 16] shows the components of the rubber compounds of Example 54 based on a mixture of styrene butadiene rubber and butadiene rubber using the additives of Examples 9, 22 and 26-28, and properties of rubbers after curing.

Table 17

[Table 17] shows the components of the rubber compounds of Example 54 based on a mixture of styrene butadiene rubber and butadiene rubber using the additives of Examples 24, 25 and 45, and properties of rubbers after curing.

DETAILED DESCRIPTION OF EMBODIMENTS OF THE INVENTION

Reference will now be made in detail to the preferred embodiments of the present invention

EXAMPLES

In the Examples and Tables given below, the numerical values of physical and chemical properties were determined experimentally according to the methods described in the following standards: Russian GOST R 54552-2011 *Rubbers and Rubber Compounds. Standard Test Methods for Viscosity, Stress Relaxation, and Pre-Vulcanization Characteristics by Mooney Viscometer* (also ASTM D 1646-2015); Russian GOST R 54547-2011. *Rubber Compounds. Standard Test Method for Property-Vulcanization Using Rotorless Cure Meters* (also ASTM D 5289-2012); Russian GOST R 54553-2011 *Vulcanized Rubber and Thermoplastic Elastomers. Standard Test Method for Tensile Stress-Strain Properties* (also ASTM D 412); Russian GOST 262-79. Rubber. Standard Test Method of Tear Strength (also ASTM D 624); Russian GOST R ISO 7619-1-2009 Rubber, *Vulcanized or Thermoplastic. Determination of Indentation Hardness. Part 1. Durometer Method* (*Shore Hardness*) (also ISO 7619-1:2004); ASTM D 991—*Standard Test Method for Rubber Property—Volume Resistivity Of Electrically Conductive and Antistatic Products*; Russian GOST-11501-78 *Petroleum Bitumens. Standard Test Method for Determination of Depth of Needle Penetration* (also DIN EN1426: 2015, ASTM D 5).

The following symbols and abbreviations are used in the Tables below: NPD—needle penetration depth (according to Russian GOST-11501-78), expressed in penetration units equal to 0.1 mm, $\rho_v$—volume resistivity, $\rho_s$—surface resistivity, M50—stress at a given elongation 50%, M100—stress at a given elongation 100%, M200—stress at a given elongation 200%, M300—stress at a given elongation 300%, TS—maximum tear stress, EB—maximum elongation at break, CrTear—crescent-shaped sample tear resistance, AnTear—angle-shaped sample tear resistance, H—hardness, λ—thermal conductivity.

Examples 1-34

Examples 1-4 illustrate comparative examples according to the prototype, i.e., additives comprising single-walled carbon nanotubes and a dispersion medium that is a low-molecular-weight solvent with average molecular weight of less than 1000 Dalton (aromatic oil TDAE Norman 346: hydrogenated extract of aromatic hydrocarbons of petrol origin with viscosity of about 0.02 Pas at 100° C., flash point 220° C.) or a liquid rubber oligomer (butadiene Kuraray LBR-352 with MW=9000 Da: liquid with viscosity of 6 Pas at 38° C., nitrile butadiene Nipol 1312 (Zeon Chemicals): liquid with viscosity of 20-30 Pas, or styrene butadiene with MW=8500 g/mol—Kuraray LSBR-820: liquid with viscosity of 350 Pas at 38° C.). The compositions of these additives, the properties of TUBALL™ single-walled carbon nanotubes (SWCNT) used for their production, as well as the properties of the dispersion medium (or liquid rubber oligomer) are given in Table 1.

Examples 5-34 illustrate the Additives of the present invention for enhancing electrical conductivity and physical and mechanical properties of rubber comprising carbon nanotubes, wherein the additives comprise 1 to 20 wt % carbon nanotubes, 3 to 90% high-viscosity organic rubber (R), and 8 to 95 wt % low-molecular-weight organic dispersion medium capable of dissolving the high-viscosity organic rubber (R). In each of the provided Examples, the additive comprises TUBALL™ single-walled carbon nanotubes with an average diameter (d) of more than 1.4 and less than 1.8 nm, specific surface area (S) of more than 300 and less than 600 m²/g, and the ratio of intensities of the G/D bands in Raman spectrum of more than 40 at 532 nm. TUBALL™ single-walled carbon nanotubes contain iron impurities in the form of nanoparticles of iron, iron carbide, and a small amount of iron oxides.

The content of iron impurities in TUBALL™ ($m_{Fe}$) is less than 15 wt %. Exceptions are Examples 15 and 24, which use TUBALL™ single-walled carbon nanotubes subjected to additional purification from iron impurities down to the content of 0.65 wt %. These single-walled carbon nanotubes are characterized by a larger specific surface area of 1230 m²/g, which is due to opening internal channels in carbon nanotubes in the course of purification. The actual values of parameters of TUBALL™ single-walled carbon nanotubes in the additives are given in Table 1. In each of the provided Examples, the additive comprises a low-molecular-weight dispersion medium and a high-viscosity organic rubber. The chemical composition, viscosity ($\eta$), and flash point of the dispersion medium ($t_{fl}$) are given in Table 1. The Table uses the following abbreviations: TDAE—treated distillate aromatic extract, an aromatic oil produced by hydrogenation of petrol distillates, Norman 346 oil was used (JSC Orgkhim), P460—paraffin oil type Petronas Process Oil P 460 (Petronas), DBP—dibutyl phthalate, PC—propylene carbonate, BC—butylene carbonate, DOA—dioctyl adipate, DOS—dioctyl sebacate, DINP—diisononyl phthalate.

The chemical composition, trademark, and viscosity of the high-viscosity organic rubber used in each additive ($ML_{(1+4)}$) expressed in Mooney units, are given in Table 1. The Table uses the following abbreviations: NR—natural rubber, NBR—nitrile butadiene rubber, EPDM—ethylene propylene diene monomer rubber. Table 1 also gives the wt % ratio of the weight of TUBALL™ to the weight of the additive ($m_{CNT}$), the wt % ratio of the weight of high-viscosity organic rubber (R) to the weight of rubber (R) solution in dispersion medium ($m_R$), and the ratio of the weight of SWCNT to the weight of rubber bound to them as determined by extraction in a solvent ($m_{CNT/BdR}$).

The additives of Examples 5-34 were produced by sequentially performing stage (I) of dissolving the high-viscosity organic rubber (R) in the dispersion medium and stage (II) of subsequently dispersing single-walled carbon nanotubes in the solution of stage (I). To prevent dust formation in the working area during dispersion, single-walled carbon nanotubes were preliminary wetted between stages (I) and (II): by a dispersion medium (oil P460) in Examples 5-14, and by a rubber solution in the dispersion medium in Examples 15-34.

The dispersion medium in the additives of Examples 5-16 comprises mineral petrol oils with a flash point of more than 200° C. and a viscosity of less than 1 St at 100° C. (21 cSt for TDAE Normal 346 and 36 cSt for Petronas P460). The dispersion medium in the additives of Examples 18-31 comprises nitrile butadiene rubber and a polar solvent with relative dielectric permittivity of more than 5 at 25° C. (DBP: 6.4; butylene carbonate: 56; propylene carbonate: 64). In Example 30, the dispersion medium is solution 1 of propylene carbonate and butylene carbonate with a 9:1 weight ratio (isomeric composition of the butylene carbonate is not known). In Example 31, the dispersion medium is solution 2 of propylene carbonate and butylene carbonate (isomeric composition of the butylene carbonate is not known) with a 1:9 weight ratio. The dispersion medium in the additives of Examples 32-34 comprises a polar solvent with a lower relative dielectric permittivity (DOS: 4.0; DINP: 4.6).

Table 2 gives data on viscosity and electrical conductivity at a temperature of 25° C. of the additives of Examples 1-34.

Examples 35-41

The additives of Examples 35-38 were produced similar to the additive of Example 9, and the additives of Examples 39-41 were produced similarly to Example 26, but with different carbon nanotubes with the properties given in Table 3. Examples 35 and 39 use carbon nanotubes comprising mostly double-walled carbon nanotubes, which is confirmed by high resolution transmission electron microscopy, the mass fraction of single-walled carbon nanotubes is about 30 wt %. Examples 36, 37 and 40 used multi-walled carbon nanotubes, but, in Example 37, they were preliminary mixed with TUBALL™ single-walled carbon nanotubes in a weight ratio of 3:1. Examples 38 and 41 used the so-called "few-walled" carbon nanotubes, i.e., multi-walled carbon nanotubes with the number of graphene layers in the wall between 2 and 5, the carbon nanotubes mostly comprised 3 to 4 graphene layers.

Examples 42-45

The additives were produced similar to the additives of Examples 9, 17 and 26, but, after stage (II), a further stage of mixing the obtained slurry, comprising carbon nanotubes, a dispersion medium, and a high-viscosity organic rubber (R), with a high-viscosity organic rubber (R2) was performed, with the ratio of the weight of rubber (R2) to the weight of the slurry after stage (II) of less than or equal to 5. The composition and type of the rubber (R2) used, the weight ratio of the weight of rubber (R2) to the weight of the slurry after stage (II), as well as the final composition of the additive and the weight ratio of carbon nanotubes to the bound rubber are given in Table 4.

Example 46

This Example illustrates producing rubber mixtures and rubbers based on EPDM rubber without carbon black using the additives of Examples 5-14. The additive of Comparative Example 2 is used for comparison with the prototype. The rubber was mixed in two stages using an internal mixer WSM SKI—3.5 L and post-mixing homogenization on two roll rubber mills 200/400 with a diameter of 200 mm, a length of 400 mm, and a friction coefficient of 1:1.2. At the first stage, rubber, oil P460, PEG 4000, $CaCO_3$, white carbon ($SiO_2$), kaolin, $TiO_2$, and ZnO are mixed for 5 minutes at the maximum mixture temperature of 150° C. At the second stage, the curing agents of triallylisocyanurate (TAIC) and bis(tert-butylperoxyisopropyl)benzene (BIPB—40—GR), as well as the additive comprising carbon nanotubes, were introduced into the rubber compound over 2 minutes at the maximum mixture temperature of 90° C. Rubber mixing comprises a stage of adding an additive comprising carbon nanotubes into the rubber compound, wherein adding of this additive into the rubber compound is combined with adding curing agents to the rubber compound.

The formulation of the rubber mixtures and the results of testing cured rubber samples for electrical conductivity and physical and mechanical properties are given in Tables 5 and 6. These data show that the additives of Examples 5-14 provide the technical result, i.e., significantly enhanced electrical conductivity and mechanical properties (moduli M50-M200 and tear resistance), while the effect of the additive of Comparative Example 2 on electrical conductivity and tear resistance is much lower, and it is actually negative on M50-M200.

The effect of the amount of additive introduced is illustrated by Table 7 which gives data for varying amounts of the additive of Example 9. Varying the concentration of carbon nanotubes in rubber from 0.04 to 1% achieves the technical result: significantly enhanced electrical conductivity and mechanical properties (moduli M50-M200 and tear resistance), some rubber samples also show significantly increased tensile strength and maximum elongation at break.

Example 47

This Example illustrates producing rubber mixtures and rubbers based on EPDM rubber without carbon black using the additives of Examples 35-38. The additive of Comparative Example 2 is used for comparison with the prototype. The rubber was mixed similarly to Example 48, in two stages using an internal mixer WSM SKI—3.5 L and post-mixing homogenization on two roll rubber mills Zamak LM 200/400 with a diameter of 200 mm, a length of 400 mm, and a friction coefficient of 1:1.2.

The formulation of the rubber mixtures and the results of testing cured rubber samples for electrical conductivity and physical and mechanical properties are given in Table 8. These data show that the additives of Examples 35-38 provide the technical result, i.e., enhanced electrical conductivity and mechanical properties (moduli M50-M200 and tear resistance), however, the largest effect is achieved when using single-walled and/or double-walled carbon nanotubes (the additives of Examples 9 and 35). Thus, additives comprising single-walled and/or double-walled carbon nanotubes are preferable.

Example 48

This Example illustrates producing rubber mixtures and rubbers based on EPDM rubber with carbon black N550, an electrically conductive filler, or electrically conductive carbon powder Vulcan XC-72, using the additive of Example 9. The additive of Comparative Example 2 is used for comparison with the prototype. The rubber was mixed in two stages: the first stage used an internal mixer WSM SKI—3.5 L, the second stage was performed on two roll rubber mills Zamak 200/400 with a diameter of 200 mm, a length of 400 mm, and a friction coefficient of 1:1.2, over 2 minutes at the maximum temperature of 90° C. The additive comprising carbon nanotubes was introduced on two roll rubber mills, combining the adding of this additive into the rubber compound with the adding of curing agents (2-mercaptobenzothiazole (MBT), tetramethylthiuram disulfide (TMTD), and sulfur) into the rubber compound.

The formulation of the rubber mixtures and the results of testing cured rubber samples for electrical conductivity and physical and mechanical properties are given in Table 9. These data show that the additive of Example 9 provides the technical result, i.e., significantly enhanced mechanical properties (moduli M50-M200 and tear resistance), as well as a very significant increase in electrical conductivity, even despite the fact that the rubber was already electrically conductive without the additive. At the same time, the effect of the additive of Comparative Example 2 on physical and mechanical properties is significantly lower and is within the measurement uncertainty, while the electrical conductivity of the rubber with this additive actually decreases.

Example 49

This example illustrates that an additional technical result can be achieved using the additive of this invention, i.e., producing colored (non-black) electrically conductive rubber mixtures and rubbers based on EPDM rubber. Rubber formulation is given in Table 10. An organic dye, phthalocyanine blue pigment, was added to the rubber mixture for coloring. Titanium dioxide content was increased to whiten the rubber. This Example also illustrates the possibility of adding carbon nanotubes into the rubber mixture as part of an additive comprising a high concentration of the high-viscosity organic rubber according to Example 42. The base rubber without the additive was mixed in two stages: at the first stage, which was performed using an internal mixer WSM SKI—3.5 L, all components, except the curing system (TAIC and peroxide), were added to the rubber; the second stage, which comprises adding the curing agents, was performed using two roll rubber mills Zamak 200/400 with a diameter of 200 mm, a length of 400 mm, and a friction coefficient of 1:1.2, over 2 minutes at the maximum temperature of 90° C. The additive comprising carbon nanotubes was introduced into the rubber using an internal mixer before adding other components of the rubber mixture into it. The resultant rubber has a rich blue color along with electrical conductivity properties sufficient to dissipate static charge. The data of Table 10 demonstrate that adding the additive of both Example 9 and Example 42 resulted in enhanced physical and mechanical properties of the rubber.

Example 50

This Example illustrates producing rubber compounds and rubbers based on a mixture of rubbers, i.e., natural rubber (SMR10 rubber was used) and butadiene rubber (BR-22 rubber was used), using the additive of any of Examples 9, 15-17 and 43-44. The additive of Comparative Example 1 is used for comparison with the prototype. The composition of rubber mixtures is given in Table 11. This composition emulates the composition of rubber mixtures in treads of agricultural and truck tires. The rubber without the additive was mixed in two stages using an internal mixer WSM SKI—3.5 L and post-mixing homogenization on two roll rubber mills Zamak 200/400 with a friction coefficient of 1:1.2. At the first stage, the rubbers, oil Nytex 4700, carbon black N234, stearic acid, ZnO, and N-(1,3-dimethyl)-N'-phenyl-1,4-phenyldiamine (6PPD) antioxidant were mixed for 5 minutes at the maximum mixture temperature of 130° C. At the second stage, the curing agents of 2,2,4-trimethyl-1,2-dihydroquinoline (TMQ); N-cyclohexyl-2-benzothiazole sulfenamide (Sulceneamide C) (CBS); diphenyl guanidine (DPG), pre-vulcanization inhibitor (PVI), and sulfur were introduced into the rubber compound over 2 minutes at the maximum mixture temperature of 100° C. The stage of adding the additive comprising carbon nanotubes was performed using two roll rubber mills Zamak 200/400 with a friction coefficient of 1:1.2, between the first and second stages of mixing the base rubber mixture. The volume resistivity of rubber samples after curing and its physical and mechanical properties are given in Table 11, pre-cut crescent-shaped samples were used for testing tear resistance. These data show that adding the additives of Examples 15-17, 43, 9 and 42 into the rubber compound significantly decreases rubber volume resistivity, increases the values of stress at a given elongation of 100-300%, tensile strength, and tear resistance, while not having a detrimental effect on the maximum elongation at break. At the same time, adding of the additive of Comparative Example 1 given herein for comparison with the Prototype does not result in any significant improvement of rubber properties.

Example 51

This Example illustrates producing rubber mixtures and rubbers based on a mixture of rubbers, i.e., natural rubber (SVR-3 L rubber was used) and butadiene rubber (Buna CB 24 rubber was used), without a plasticizer oil using the additive of any of Examples 16, 17 and 25. The additive of Comparative Example 1 is used for comparison with the prototype. The composition of rubber mixtures is given in Table 12. The rubber without the additive was mixed in two stages using an internal mixer WSM SKI—3.5 L and post-mixing homogenization on two roll rubber mills Zamak 200/400 with a friction coefficient of 1:1.2. At the first stage, the rubbers, carbon black N330, stearic acid, ZnO, and N-(isopropyl)-N'-phenyl-1,4-phenyldiamine (iPPD) antioxidant were mixed for 5 minutes at the maximum mixture temperature 130° C. At the second stage, the curing agents of benzothiazole sulfenamide (CBS); diphenyl guanidine (DPG), and sulfur, as well as the additive were introduced into the rubber compound over 2 minutes at the maximum temperature of 100° C. The stage of adding the additive comprising carbon nanotubes is thus combined with the stage of adding the curing system.

The volume resistivity of rubber samples after curing and its physical and mechanical properties are given in Table 12, pre-cut crescent-shaped samples were used for testing tear resistance. Adding the additives of Examples 16, 17, and 25 into the rubber compound significantly decreases rubber volume resistivity, increases the values of stress at a given elongation of 100-300%, as well as tear resistance, while not having a significant detrimental effect on the maximum elongation at break and tensile strength. Adding the additives of Examples 16, 17, and 25 into the rubber compound also increases rubber hardness. At the same time, adding of the additive of Comparative Example 1 given herein for comparison with the Prototype does not result in any significant improvement of rubber properties.

Example 52

This Example illustrates producing rubber mixtures and rubbers based on nitrile butadiene rubber filled with carbon black using the additive of Examples 18-20, 25-26, and 44. To compare with the prototype, the additive of Comparative Example 3 was used (dispersion of single-walled carbon nanotubes in liquid nitrile butyl rubber oligomer Nipol 1213). The rubber was mixed in two stages using an internal mixer WSM SKI—3.5 L and post-mixing homogenization on two roll rubber mills 200/400 with a diameter of 200 mm, a length of 400 mm, and a friction coefficient of 1:1.2. At the first stage, the rubber, carbon black, ZnO, stearic acid, dibutyl phthalate (DBP), and N-(isopropyl)-N'-phenyl-1,4-phenyldiamine (iPPD) antioxidant were mixed for 5 minutes at the maximum mixture temperature of 120° C. At the second stage, the curing agents of N-cyclohexyl-2-benzothiazole sulfenamide (CZ) and sulfur, over 2 minutes at the maximum mixture temperature of 90° C. The stage of adding the additive comprising carbon nanotubes was performed using an internal mixer, wherein adding this additive into the rubber compound is combined with adding curing agents into the rubber compound.

The formulation of the rubber mixtures and the results of testing cured rubber samples for electrical conductivity and physical and mechanical properties are given in Table 13. These data show that the additives of Examples 18-20, 25-26, and 46 provide the technical result, i.e., enhanced mechanical properties (moduli M50-M200 and tear resistance), as well as enhanced electrical conductivity, while the effect of the additive of Comparative Example 3 on the electrical conductivity is significantly lower, and there is no effect on physical and mechanical properties.

Example 53

This Example illustrates producing rubber mixtures and rubbers based on nitrile butadiene rubber filled with silicon dioxide using the additive of Examples 21-23, 25, 29, 31-34, and 39-41. To compare with the prototype, the additive of Comparative Example 3 was used (dispersion of single-walled carbon nanotubes in liquid nitrile butyl rubber oligomer Nipol 1213). The rubber was mixed in two stages using an internal mixer WSM SKI—3.5 L and post-mixing homogenization on two roll rubber mills 200/400 with a diameter of 200 mm, a length of 400 mm, and a friction coefficient of 1:1.2.

At the first stage, the rubber, carbon black, ZnO, stearic acid, silicon dioxide, silane coupling agent TESPT (Si-69), titanium dioxide and N-(isopropyl)-N'-phenyl-1,4-phenyldiamine (iPPD) antioxidant were mixed for 5 minutes at the maximum mixture temperature of 150° C. At the second stage, the curing agents of mercaptobenzothiazole disulfide (MBTS), tetramethylthiuram disulfide (TMTD), and sulfur were introduced into the rubber compound over 2 minutes at the maximum temperature of 90° C. The stage of adding the additive comprising carbon nanotubes was performed using an internal mixer, wherein adding this additive into the rubber compound is combined with adding curing agents into the rubber compound.

The formulation of the rubber mixtures and the results of testing cured rubber samples for electrical conductivity and physical and mechanical properties are given in Tables 14 and 15. These data show that the additives of Examples 21-23, 25, 29, 31-34, and 39-41 provide the technical result, i.e., enhanced mechanical properties (moduli M50-M200 and tear resistance) and electrical conductivity of rubber sufficient to dissipate static charge, although achieving the technical result requires a larger amount of Additives 40-41 (comprising multi-walled carbon nanotubes), while the effect of the additive of Comparative Example 3 on electrical conductivity and tear resistance is insignificant.

Example 54

This Example illustrates producing rubber mixtures and rubbers based on a mixture of rubbers, i.e., styrene butadiene rubber (solution SBR Buna VSL 4526-2HM expanded with TDAE oil) and butadiene rubber (Buna CB 24 rubber was used), using the additive of any of Examples 9, 22, 24-28, and 45. To compare with the prototype, the additive of Comparative Example 4 was used, in which single-walled carbon nanotubes were dispersed in liquid oligomer of styrene butadiene rubber Kuraray LSBR-820. The composition of rubber mixtures is given in Tables 16 and 17. This composition emulates the composition of the rubber mixtures for treads of car tires. It should be noted that the rubber mixtures do not comprise carbon black or any other electrically conductive fillers apart from the Additive comprising carbon nanotubes. The rubber without the Additive was mixed in three stages using an internal mixer WSM SKI—3.5 L and post-mixing homogenization on two roll rubber mills Zamak 200/400 with a friction coefficient of 1:1.2.

At the first stage, the rubbers, oil TDAE Normal 346, silicon dioxide, silane coupling agent bis(triethoxysilylpropyl)tetrasulfide (Si-69), and stearic acid were mixed for 5 minutes at the maximum mixture temperature of 150° C. The amount of the plasticizer (TDAE oil) was reduced by the amount of low-molecular-weight dispersion medium introduced with the Additive. At the second stage, mixture homogenization was performed, and zinc oxide and N-(1,3-dimethyl)-N'-phenyl-1,4-phenyldiamine (iPPD) antioxidant were added over 2 minutes at the maximum mixture temperature of 110° C. At the third stage, the curing agents of sulfur, N-tert-butyl-2-benzothiazole sulfenamide (TBBS) and diphenyl guanidine (DPG) were introduced into the rubber compound over 2 minutes at the maximum mixture temperature of 110° C. The additive was introduced at the second stage, while combining the stage of adding the Additive with mixture homogenization and addition of zinc oxide and antioxidant. An exception is addition of the Additive of Example 45 into styrene butadiene rubber at a separate stage on two roll rubber mills prior to stage 1. The volume resistivity of rubber samples after curing and its physical and mechanical properties are given in Tables 16 and 17, pre-cut crescent-shaped samples were used for testing tear resistance.

This data shows that adding the Additives of Examples 9, 22, 24-28, and 45 into the rubber compound significantly decreases volume resistivity and surface resistance of rubber, while providing an electrically conductive rubber even in the absence of any other electrically conductive fillers, increases the values of stress at a given elongation of 100-300% and tensile strength, as well as tear resistance, while not having a detrimental effect on the maximum elongation at break. At the same time, adding of the additive of Comparative Example 4 given herein for comparison with the Prototype does not result in any significant improvement of rubber properties.

As Table 17 demonstrates, adding the additive of Examples 24-25 and 45 significantly increases loss tangent in dynamical mechanical tests (tan(S)) at 0° C., which characterizes the friction coefficient and traction of tire tread. Thus, adding the additive in the rubber mixture for production of tire tread can significantly improve tire quality. It should be noted that this addition of the additive has only a very insignificant effect on (tan(6)) at elevated temperatures (such as at 60° C.), i.e., it does not increase rolling resistance of the tire.

It should also be noted that this Example further illustrates achieving an additional technical effect, i.e., increased thermal conductivity of the cured rubber by 10% upon adding 0.38 wt % carbon nanotubes. Thermal conductivity data is given in Table 17.

TABLE 1

| Example | $m_{CNT}$, wt % | $d_{CNT}$, nm | $S_{CNT}$, m²/g | G/D | $m_{Fe}$, wt % | Dispers. medium | η, Pa·s | $t_{fl}$, °C. | High-viscosity rubber, R | $m_R$, wt % | $ML_{(1+4)}$, MU | $m_{CNT}/m_{BdR}$ |
|---|---|---|---|---|---|---|---|---|---|---|---|---|
| 1 (comp) | 10 | 1.6 | 480 | 60 | 14.1 | TDAE oil | 0.02 (100° C.) | 220 | None | — | — | — |
| 2 (comp) | 5 | 1.6 | 480 | 60 | 14.1 | LBR-352 | 6 (38° C.) | — | None | — | — | >100 |
| 3 (comp) | 5 | 1.6 | 480 | 60 | 14.1 | Nipol-1312 | 22 (25° C.) | — | None | — | — | >100 |
| 4 (comp) | 10 | 1.6 | 480 | 60 | 14.1 | L-SBR-820 | 350 (38° C.) | — | None | — | — | >100 |
| 5 | 10 | 1.6 | 480 | 60 | 14.1 | P460 oil | 0.03 (100° C.) | 270 | EPDM Keltan 4450 | 10 | 46 (125° C.) | 2.1 |
| 6 | 10 | 1.6 | 480 | 60 | 14.1 | P460 oil | 0.03 (100° C.) | 270 | EPDM Keltan 2650 | 10 | 25 (125° C.) | 1.9 |
| 7 | 10 | 1.6 | 480 | 60 | 14.1 | P460 oil | 0.03 (100° C.) | 270 | EPDM Vistalon7001 | 10 | 60 (125° C.) | 1.6 |
| 8 | 10 | 1.6 | 480 | 60 | 14.1 | P460 oil | 0.03 (100° C.) | 270 | EPDM Vistalon2502 | 10 | 25 (125° C.) | 2 |
| 9 | 5 | 1.54 | 520 | 72 | 12.2 | P460 oil | 0.03 (100° C.) | 270 | EPDM Vistalon2502 | 10 | 25 (125° C.) | 1.2 |
| 10 | 5 | 1.54 | 520 | 72 | 12.2 | P460 oil | 0.03 (100° C.) | 270 | EPDM Vistalon2502 | 4 | 25 (125° C.) | 2.6 |
| 11 | 5 | 1.54 | 520 | 72 | 12.2 | P460 oil | 0.03 (100° C.) | 270 | EPDM Vistalon2502 | 7 | 25 (125° C.) | 1.9 |
| 12 | 5 | 1.54 | 520 | 72 | 12.2 | P460 oil | 0.03 (100° C.) | 270 | EPDM Vistalon2502 | 15 | 25 (125° C.) | 1.1 |
| 13 | 5 | 1.54 | 520 | 72 | 12.2 | P460 oil | 0.03 (100° C.) | 270 | EPDM Vistalon2502 | 20 | 25 (125° C.) | 0.95 |
| 14 | 5 | 1.54 | 520 | 72 | 12.2 | P460 oil | 0.03 (100° C.) | 270 | EPDM Vistalon2502 | 40 | 25 (125° C.) | 0.89 |
| 15 | 1 | 1.59 | 1230 | 71 | 0.64 | TDAE oil | 0.02 (100° C.) | 220 | NR SVR 3L | 10 | 75 (100° C.) | 0.4 |
| 16 | 5 | 1.65 | 470 | 54 | 9.8 | TDAE oil | 0.02 (100° C.) | 220 | NR SVR 3L | 18 | 75 (100° C.) | 0.55 |
| 17 | 10 | 1.65 | 470 | 54 | 9.8 | TDAE oil | 0.02 (100° C.) | 220 | NR SVR 3L | 25 | 75 (100° C.) | 0.62 |
| 18 | 5 | 1.7 | 460 | 84 | 14.3 | DBP | 0.016 (25° C.) | 157 | NBR Perbunan2831 | 20 | 30 (100° C.) | 0.48 |
| 19 | 5 | 1.7 | 460 | 84 | 14.3 | DBP | 0.016 (25° C.) | 157 | NBR Krynac 3330F | 20 | 30 (100° C.) | 0.52 |
| 20 | 5 | 1.7 | 460 | 84 | 14.3 | DBP | 0.016 (25° C.) | 157 | NBR Krynac28120F | 20 | 120 (100° C.) | 0.51 |
| 21 | 5 | 1.7 | 460 | 84 | 14.3 | DBP | 0.016 (25° C.) | 157 | NBR Perbunan 3965 | 15 | 65 (100° C.) | 0.83 |

TABLE 1-continued

| Example | $m_{CNT}$, wt % | $d_{CNT}$, nm | $S_{CNT}$, m²/g | G/D | $m_{Fe}$, wt % | Dispers. medium | η, Pa·s | $t_{fl}$ °C. | High-viscosity rubber, R | $m_R$, wt % | $ML_{(1+4)}$, MU | $m_{CNT}/m_{BdR}$ |
|---|---|---|---|---|---|---|---|---|---|---|---|---|
| 22 | 5 | 1.7 | 460 | 84 | 14.3 | DBP | 0.016 (25° C.) | 157 | NBR Perbunan 3965 | 25 | 65 (100° C.) | 0.75 |
| 23 | 5 | 1.7 | 460 | 84 | 14.3 | DBP | 0.016 (25° C.) | 157 | NBR Perbunan 3945 | 40 | 45 (100° C.) | 0.53 |
| 24 | 5 | 1.59 | 1230 | 71 | 0.64 | PC | 0.002 (25° C.) | 132 | NBR Perbunan 3965 | 15 | 65 (100° C.) | 0.70 |
| 25 | 5 | 1.65 | 470 | 54 | 9.8 | PC | 0.002 (25° C.) | 132 | NBR Perbunan 3965 | 23 | 65 (100° C.) | 0.6 |
| 26 | 10 | 1.65 | 470 | 54 | 9.8 | PC | 0.002 (25° C.) | 132 | NBR Perbunan 3965 | 25 | 65 (100° C.) | 0.65 |
| 27 | 15 | 1.65 | 470 | 54 | 9.8 | PC | 0.002 (25° C.) | 132 | NBR Perbunan 3965 | 25 | 65 (100° C.) | 0.76 |
| 28 | 20 | 1.65 | 470 | 54 | 9.8 | PC | 0.002 (25° C.) | 132 | NBR Perbunan 3945 | 25 | 45 (100° C.) | 1.05 |
| 29 | 5 | 1.65 | 470 | 54 | 9.8 | BC | 0.002 (25° C.) | 130 | NBR Perbunan 3965 | 25 | 65 (100° C.) | 0.73 |
| 30 | 5 | 1.65 | 470 | 54 | 9.8 | Solution 1 | 0.002 (25° C.) | 130 | NBR Perbunan 3965 | 25 | 65 (100° C.) | 0.71 |
| 31 | 5 | 1.65 | 470 | 54 | 9.8 | Solution 2 | 0.002 (25° C.) | 130 | NBR Perbunan 3965 | 25 | 65 (100° C.) | 0.75 |
| 32 | 5 | 1.7 | 460 | 84 | 14 | DOA | 0.015 (20° C.) | 194 | NBR Perbunan 3965 | 18 | 65 (100° C.) | 3.6 |
| 33 | 5 | 1.7 | 460 | 84 | 14 | DOS | 0.02 (20° C.) | 215 | NBR Perbunan 3965 | 18 | 65 (100° C.) | 3.4 |
| 34 | 5 | 1.7 | 460 | 84 | 14 | DINP | 0.08 (20° C.) | 200 | NBR Perbunan 3965 | 18 | 65 (100° C.) | 2.9 |

TABLE 2

| Example | $m_{CNT}$, wt % | Dispersion medium | High-viscosity rubber, R | $m_R$, wt % | $ML_{(1+4)}$ 25° C., MU | NPD, 0.1 mm | ρv, Ohm·m |
|---|---|---|---|---|---|---|---|
| 1 (Comp.) | 10 | TDAE oil | None | — | 27 | <20 | 0.05 |
| 2 (Comp.) | 5 | LBR-352 | None | — | 12 | 76 | 0.18 |
| 3 (Comp.) | 5 | Nipol-1312 | None | — | 14 | 63 | 0.15 |
| 4 (Comp.) | 10 | L-SBR-820 | None | — | 86 | <20 | 0.25 |
| 5 | 10 | P460 oil | Keltan 4450 | 10 | 37 | <20 | 0.015 |
| 6 | 10 | P460 oil | Keltan 2650 | 10 | 30 | <20 | 0.06 |
| 7 | 10 | P460 oil | Vistalon 7001 | 10 | 40 | <20 | 0.04 |
| 8 | 10 | P460 oil | Vistalon 2502 | 10 | 35 | <20 | 0.04 |
| 9 | 5 | P460 oil | Vistalon 2502 | 10 | 14 | 57 | 0.7 |
| 10 | 5 | P460 oil | Vistalon 2502 | 4 | 10 | 105 | 0.4 |
| 11 | 5 | P460 oil | Vistalon 2502 | 7 | 15 | 51 | 0.7 |
| 12 | 5 | P460 oil | Vistalon 2502 | 15 | 21 | <20 | 0.8 |
| 13 | 5 | P460 oil | Vistalon 2502 | 20 | 28 | <20 | 0.8 |
| 14 | 5 | P460 oil | Vistalon 2502 | 40 | 30 | <20 | 0.9 |
| 15 | 1 | TDAE oil | SVR 3L | 10 | 5 | 166 | 890 |
| 16 | 5 | TDAE oil | SVR 3L | 10 | 8 | 83 | 2.0 |
| 17 | 10 | TDAE oil | SVR 3L | 25 | 32 | <20 | 0.15 |
| 18 | 5 | DBP | Perbunan 2831F | 20 | 12 | 90 | 4.2 |
| 19 | 5 | DBP | Krynac 3330F | 20 | 10 | 102 | 6.1 |
| 20 | 5 | DBP | Krynac 28120F | 20 | 25 | <20 | 2.3 |
| 21 | 5 | DBP | Perbunan 3965 | 15 | 9 | 114 | 0.15 |
| 22 | 5 | DBP | Perbunan 3965 | 25 | 13 | 80 | 1.2 |
| 23 | 5 | DBP | Perbunan 3945 | 40 | 18 | 26 | 2.2 |
| 24 | 5 | PC | Perbunan 3965 | 15 | 8 | 125 | 0.7 |
| 25 | 5 | PC | Perbunan 3965 | 23 | 9 | 112 | 0.5 |
| 26 | 10 | PC | Perbunan 3965 | 25 | 34 | <20 | 0.12 |
| 27 | 15 | PC | Perbunan 3965 | 25 | 55 | <20 | 0.03 |
| 28 | 20 | PC | Perbunan 3965 | 25 | 71 | <20 | 0.008 |
| 29 | 5 | BC | Perbunan 3965 | 25 | 12 | 89 | 0.8 |
| 30 | 5 | Solution 1 | Perbunan 3965 | 25 | 9 | 102 | 0.6 |
| 31 | 5 | Solution 2 | Perbunan 3965 | 25 | 10 | 98 | 0.4 |
| 32 | 5 | DOA | Perbunan 3965 | 20 | 14 | 59 | 1.8 |
| 33 | 5 | DOS | Perbunan 3965 | 20 | 16 | 40 | 1.4 |
| 34 | 5 | DINP | Perbunan 3965 | 20 | 13 | 73 | 1.9 |

TABLE 3

| Example | CNT in additive | d, nm | G/D | S, m²/g | Comment |
|---|---|---|---|---|---|
| 35 and 39 | DWCNT and SWCNT | 1.3-3.2 | 46 | 420 | SWCNT fraction about 30 wt % |
| 36 and 40 | MWCNT | 9-14 | 0.8 | 230 | 6-10 graphene layers in MWCNT wall |
| 37 | MWCNT and SWCNT | 1.3-14 | 14 | 300 | 3:1 mixture with TUBALL |
| 38 and 41 | MWCNT | 3-7 | 6.2 | 410 | 2-5 graphene layers in MWCNT wall |

TABLE 4

| Example | Slurry of Example | Rubber R2 Composition and type | R2:slurry | Additive composition, wt % Dispersion medium | R + R2 | CNT | $m_{CNT}/m_{BdR}$ |
|---|---|---|---|---|---|---|---|
| 42 | 9 | EPDM | 4 | 15.6 | 83.4 | 1 | 0.95 |
| 43 | 17 | NR SVR 3L | 4 | 13.5 | 84.5 | 2 | 0.61 |
| 44 | 26 | NBR Perbunan 3965 | 5 | 11.2 | 87.1 | 1.67 | 0.65 |
| 45 | 26 | SBR Buna VSL 4526 2HM | 5 | 11.2 | 87.1 | 1.67 | 0.63 |

TABLE 5

| | Comparative examples | | | Invention examples | | | |
|---|---|---|---|---|---|---|---|
| Additive of Example | None | 2 | 5 | 6 | 7 | 8 | 9 |
| Additive concentration, wt % | 0 | 6 | 3 | 3 | 3 | 3 | 6 |
| CNT concentration in rubber, wt % | 0 | 0.3 | 0.3 | 0.3 | 0.3 | 0.3 | 0.3 |
| Composition of rubber mixture, parts (w/w) | | | | | | | |
| EPDM rubber Keltan 4450 | 100 | 100 | 100 | 100 | 100 | 100 | 100 |
| Additive | None | 12.1 | 5.85 | 5.85 | 5.85 | 5.85 | 12.1 |
| P460 oil | 5.0 | 5.0 | 5.0 | 5.0 | 5.0 | 5.0 | 5.0 |
| PEG 4000 | 2.0 | 2.0 | 2.0 | 2.0 | 2.0 | 2.0 | 2.0 |
| Chalk | 10.0 | 10.0 | 10.0 | 10.0 | 10.0 | 10.0 | 10.0 |
| White carbon | 43.0 | 43.0 | 43.0 | 43.0 | 43.0 | 43.0 | 43.0 |
| Kaolin | 10.0 | 10.0 | 10.0 | 10.0 | 10.0 | 10.0 | 10.0 |
| $TiO_2$ | 5.0 | 5.0 | 5.0 | 5.0 | 5.0 | 5.0 | 5.0 |
| ZnO | 3.0 | 3.0 | 3.0 | 3.0 | 3.0 | 3.0 | 3.0 |
| TAIC | 8.0 | 8.0 | 8.0 | 8.0 | 8.0 | 8.0 | 8.0 |
| BIPB-40-GR | 3.0 | 3.0 | 3.0 | 3.0 | 3.0 | 3.0 | 3.0 |
| Test results for cured rubber | | | | | | | |
| $\rho_V$, Ohm·m | ≥1.0E+11 | 6.3E+06 | 7.8E+04 | 1.0E+03 | 3.3E+05 | 1.2E+03 | 2.7E+01 |
| $\rho_S$, Ohm/□ | ≥1.0E+12 | 5.2E+10 | 4.6E+08 | 1.5E+07 | 2.8E+09 | 1.4E+07 | 3.4E+05 |
| M50, MPa | 2.7 | 1.8 | 2.6 | 3.2 | 2.9 | 3.2 | 3.4 |
| M100, MPa | 4.3 | 4 | 4.3 | 5.1 | 4.5 | 5.1 | 5.6 |
| M200, MPa | 7.8 | 7.4 | 7.7 | 8.2 | 8.0 | 8.4 | 8.9 |
| TS, MPa | 11.8 | 11.9 | 11.2 | 11.9 | 11.8 | 12.1 | 12.4 |
| EB, % | 290 | 183 | 265 | 310 | 296 | 314 | 324 |
| AnTear, kN/m | 13.2 | 15.3 | 20.1 | 21.3 | 19.4 | 19.4 | 25.8 |

TABLE 6

| | Comp. examples | | Invention examples | | | | |
|---|---|---|---|---|---|---|---|
| Additive of Example | None | 2 | 10 | 11 | 12 | 13 | 14 |
| Additive concentration, wt % | 0 | 6 | 6 | 6 | 6 | 6 | 6 |
| CNT concentration in rubber, wt % | 0 | 0.3 | 0.3 | 0.3 | 0.3 | 0.3 | 0.3 |
| Composition of rubber mixture, parts (w/w) | | | | | | | |
| EPDM rubber Keltan 4450 | 100 | 100 | 100 | 100 | 100 | 100 | 100 |

TABLE 6-continued

|  | Comp. examples |  | Invention examples |  |  |  |  |
|---|---|---|---|---|---|---|---|
| Additive | None | 12.1 | 12.1 | 12.1 | 12.1 | 12.1 | 12.1 |
| P460 oil | 5.0 | 5.0 | 5.0 | 5.0 | 5.0 | 5.0 | 5.0 |
| PEG 4000 | 2.0 | 2.0 | 2.0 | 2.0 | 2.0 | 2.0 | 2.0 |
| Chalk | 10.0 | 10.0 | 10.0 | 10.0 | 10.0 | 10.0 | 10.0 |
| White carbon | 43.0 | 43.0 | 43.0 | 43.0 | 43.0 | 43.0 | 43.0 |
| Kaolin | 10.0 | 10.0 | 10.0 | 10.0 | 10.0 | 10.0 | 10.0 |
| $TiO_2$ | 5.0 | 5.0 | 5.0 | 5.0 | 5.0 | 5.0 | 5.0 |
| ZnO | 3.0 | 3.0 | 3.0 | 3.0 | 3.0 | 3.0 | 3.0 |
| TAIC | 8.0 | 8.0 | 8.0 | 8.0 | 8.0 | 8.0 | 8.0 |
| BIPB-40-GR | 3.0 | 3.0 | 3.0 | 3.0 | 3.0 | 3.0 | 3.0 |
| Test results for cured rubber ||||||||
| $\rho_V$, Ohm·m | ≥1.0E+11 | 6.3E+06 | 4.7E+05 | 3.1E+04 | 2.5E+04 | 6.8E+04 | 1.3E+06 |
| $\rho_S$, Ohm/□ | ≥1.0E+12 | 5.2E+10 | 3.5E+07 | 2.6E+06 | 9.4E+05 | 3.4E+07 | 8.6E+08 |
| M50, MPa | 2.7 | 1.8 | 2.8 | 3.2 | 3.3 | 3.3 | 2.9 |
| M100, MPa | 4.3 | 4.0 | 5.0 | 5.1 | 5.7 | 5.6 | 4.8 |
| M200, MPa | 7.8 | 7.4 | 7.9 | 8.2 | 9.0 | 8.6 | 7.9 |
| TS, MPa | 11.8 | 11.9 | 12.0 | 12.1 | 12.1 | 12.1 | 11.9 |
| EB, % | 290 | 183 | 289 | 310 | 310 | 317 | 286 |
| AnTear, kN/m | 13.2 | 15.3 | 19.1 | 22.6 | 25.4 | 22.8 | 17.8 |

TABLE 7

|  | w/o add. | Amount of introduced additive of Example 9 |  |  |  |  |  |
|---|---|---|---|---|---|---|---|
| Additive concentration, wt % | — | 0.8 | 2 | 4 | 6 | 10 | 20 |
| CNT concentration in rubber, wt % | 0 | 0.04 | 0.1 | 0.2 | 0.3 | 0.5 | 1 |
| Composition of rubber mixture, parts (w/w) ||||||||
| EPDM rubber Keltan 4450 | 100 | 100 | 100 | 100 | 100 | 100 | 100 |
| Additive | — | 1.5 | 3.9 | 7.9 | 12.1 | 21.0 | 25.8 |
| P460 oil | 5.0 | 5.0 | 5.0 | 5.0 | 5.0 | 5.0 | 5.0 |
| PEG 4000 | 2.0 | 2.0 | 2.0 | 2.0 | 2.0 | 2.0 | 2.0 |
| Chalk | 10.0 | 10.0 | 10.0 | 10.0 | 10.0 | 10.0 | 10.0 |
| White carbon | 43.0 | 43.0 | 43.0 | 43.0 | 43.0 | 43.0 | 43.0 |
| Kaolin | 10.0 | 10.0 | 10.0 | 10.0 | 10.0 | 10.0 | 10.0 |
| $TiO_2$ | 5.0 | 5.0 | 5.0 | 5.0 | 5.0 | 5.0 | 5.0 |
| ZnO | 3.0 | 3.0 | 3.0 | 3.0 | 3.0 | 3.0 | 3.0 |
| TAIC | 8.0 | 8.0 | 8.0 | 8.0 | 8.0 | 8.0 | 8.0 |
| BIPB-40-GR | 3.0 | 3.0 | 3.0 | 3.0 | 3.0 | 3.0 | 3.0 |
| Test results for cured rubber ||||||||
| $\rho_V$, Ohm·m | ≥1E+11 | 4.7E+08 | 1.3E+06 | 8.0E+04 | 220 | 450 | 11 |
| $\rho_S$, Ohm/□ | ≥1E+12 | 6.7E+12 | 7.8E+10 | 1.0E+08 | 1.0E+05 | 1.0E+04 | 1.0E+03 |
| M50, MPa | 2.7 | 2.9 | 3.0 | 3.3 | 3.6 | 3.6 | 5.8 |
| M100, MPa | 4.3 | 4.6 | 4.7 | 4.6 | 4.9 | 5.8 | 6.9 |
| M200, MPa | 7.8 | 8.1 | 8.4 | 7.9 | 7.8 | 8.1 | 7.6 |
| TS, MPa | 11.8 | 12.0 | 12.3 | 13.3 | 14.0 | 14.2 | 12.4 |
| EB, % | 290 | 289 | 275 | 335 | 351 | 322 | 330 |
| AnTear, kN/m | 13.2 | 15.2 | 16.2 | 18.2 | 24.5 | 29.9 | 44.6 |

TABLE 8

|  | Comp. examples | Invention examples |  |  |  |  |  |
|---|---|---|---|---|---|---|---|
| Additive of Example No. | — | 2 | 9 | 35 | 36 | 37 | 38 |
| Additive, wt % | — | 6 | 6 | 6 | 10 | 10 | 10 |
| CNT concentration in rubber, wt % | — | 0.3 | 0.3 | 0.3 | 0.5 | 0.5 | 0.5 |
| Composition of rubber mixture, parts (w/w) ||||||||
| EPDM rubber Keltan 4450 | 100 | 100 | 100 | 100 | 100 | 100 | 100 |
| Additive | — | 12.1 | 12.1 | 12.1 | 21.0 | 21.0 | 21.0 |
| P460 oil | 5.0 | 5.0 | 5.0 | 5.0 | 5.0 | 5.0 | 5.0 |
| PEG 4000 | 2.0 | 2.0 | 2.0 | 2.0 | 2.0 | 2.0 | 2.0 |

TABLE 8-continued

|  | Comp. examples | | Invention examples | | | | |
| --- | --- | --- | --- | --- | --- | --- | --- |
| Chalk | 10.0 | 10.0 | 10.0 | 10.0 | 10.0 | 10.0 | 10.0 |
| White carbon | 43.0 | 43.0 | 43.0 | 43.0 | 43.0 | 43.0 | 43.0 |
| Kaolin | 10.0 | 10.0 | 10.0 | 10.0 | 10.0 | 10.0 | 10.0 |
| $TiO_2$ | 5.0 | 5.0 | 5.0 | 5.0 | 5.0 | 5.0 | 5.0 |
| ZnO | 3.0 | 3.0 | 3.0 | 3.0 | 3.0 | 3.0 | 3.0 |
| TAIC | 8.0 | 8.0 | 8.0 | 8.0 | 8.0 | 8.0 | 8.0 |
| BIPB-40-GR | 3.0 | 3.0 | 3.0 | 3.0 | 3.0 | 3.0 | 3.0 |
| Test results for cured rubber | | | | | | | |
| $\rho_V$, Ohm · m | ≥1E+11 | 6.3E+06 | 2.7E+01 | 3.4E+02 | 7.4E+08 | 1.8E+05 | 2.9E+06 |
| $\rho_S$, Ohm/□ | ≥1E+12 | 5.2E+10 | 3.4E+05 | 7.2E+05 | 6.2E+11 | 7.8E+07 | 3.4E+10 |
| M50, MPa | 2.7 | 1.8 | 3.4 | 3.3 | 2.9 | 3.3 | 3.0 |
| M100, MPa | 4.3 | 4.0 | 5.6 | 5.2 | 4.5 | 4.9 | 4.7 |
| M200, MPa | 7.8 | 7.4 | 8.9 | 8.4 | 7.9 | 8.0 | 8.1 |
| TS, MPa | 11.8 | 11.9 | 12.4 | 12.2 | 12.0 | 12.8 | 12.1 |
| EB, % | 290 | 183 | 324 | 318 | 292 | 320 | 278 |
| AnTear, kN/m | 13.2 | 15.3 | 25.8 | 23.8 | 15.5 | 18.1 | 16.7 |

TABLE 9

|  | Comparative examples | | Invention examples | | | | |
| --- | --- | --- | --- | --- | --- | --- | --- |
| Additive of Example | — | — | 2 | 9 | 9 | 9 | 9 |
| Additive concentration, wt % | — | — | 6 | 4 | 6 | 4 | 6 |
| CNT concentration in rubber, wt % | 0 | 0 | 0.3 | 0.2 | 0.3 | 0.2 | 0.3 |
| Composition of rubber mixture, parts (w/w) | | | | | | | |
| EPDM rubber Keltan 4450 | 100 | 100 | 100 | 100 | 100 | 100 | 100 |
| Additive | — | — | 11.11 | 7.25 | 11.11 | 6.55 | 9.80 |
| CB N550 | 50 | — | 50 | 50 | 50 | — | — |
| Vulcan XC-72 | — | 30 | — | — | — | 30 | 30 |
| ZnO | 5 | 5 | 5 | 5 | 5 | 5 | 5 |
| Stearic acid | 1 | 1 | 1 | 1 | 1 | 1 | 1 |
| $TiO_2$ | 5 | 5 | 5 | 5 | 5 | 5 | 5 |
| P460 oil | 5 | 5 | 5 | 5 | 5 | 5 | 5 |
| MBT | 0.5 | 0.5 | 0.5 | 0.5 | 0.5 | 0.5 | 0.5 |
| TMTD | 1 | 1 | 1 | 1 | 1 | 1 | 1 |
| Sulfur | 1.5 | 1.5 | 1.5 | 1.5 | 1.5 | 1.5 | 1.5 |
| Test results for cured rubber | | | | | | | |
| $\rho_V$, Ohm · m | 120 | 11 | 190 | 38 | 0.1 | 0.23 | 0.01 |
| $\rho_S$, Ohm/□ | 2.3E+03 | 4.2E+02 | 5.0E+03 | 7.7E+02 | 1.1E+01 | 1.4E+01 | 1.1E+01 |
| M50, MPa | 2.9 | 3.1 | 3.0 | 3.4 | 4.2 | 3.3 | 4.2 |
| M100, MPa | 5.4 | 5.9 | 5.6 | 6.0 | 6.2 | 5.6 | 6.2 |
| M200, MPa | 10.1 | 11.3 | 10.9 | 12.4 | 13.9 | 12.3 | 13.0 |
| TS, MPa | 15.8 | 17.4 | 16.2 | 18.7 | 19.7 | 18 | 18.7 |
| EB, % | 286 | 339 | 280 | 310 | 294 | 278 | 287 |
| AnTear, kN/m | 18.6 | 21.5 | 19.1 | 20.7 | 26.1 | 21.3 | 24.1 |

TABLE 10

| Additive of Example | None | 9 | 9 | 42 | 42 |
| --- | --- | --- | --- | --- | --- |
| Additive concentration, wt % | — | 4 | 6 | 20 | 30 |
| CNT concentration in rubber, wt % |  | 0.2 | 0.3 | 0.2 | 0.3 |
| Composition of rubber mixture, parts (w/w) | | | | | |
| EPDM Keltan 4450 | 100 | 100 | 100 | 67.8 | 39.2 |
| Additive | — | 8.3 | 12.7 | 41.5 | 63.5 |
| Plasticizer | 5.0 | 5.0 | 5.0 | 5.0 | 5.0 |
| PEG 4000 | 2.0 | 2.0 | 2.0 | 2.0 | 2.0 |
| Chalk | 10.0 | 10.0 | 10.0 | 10.0 | 10.0 |
| White carbon | 43.0 | 43.0 | 43.0 | 43.0 | 43.0 |
| Kaolin | 10.0 | 10.0 | 10.0 | 10.0 | 10.0 |
| TiO2 | 10.0 | 10.0 | 10.0 | 10.0 | 10.0 |

TABLE 10-continued

| | | | | | |
|---|---|---|---|---|---|
| Phthalocyanine blue pigment | 5.0 | 5.0 | 5.0 | 5.0 | 5.0 |
| ZnO | 3.0 | 3.0 | 3.0 | 3.0 | 3.0 |
| TAIC | 8.0 | 8.0 | 8.0 | 8.0 | 8.0 |
| Peroxide (BIPB-40-GR) | 3.0 | 3.0 | 3.0 | 3.0 | 3.0 |
| Test results for cured rubber | | | | | |
| $\rho v$, Ohm · m | ≥1.0E+12 | 7.5E+04 | 2.0E+03 | 5.3E+04 | 1.2E+03 |
| $\rho s$, Ohm/□ | ≥1.0E+12 | 1.0E+09 | 5.5E+05 | 8.2E+08 | 2.1E+05 |
| M50, MPa | 2.7 | 2.9 | 3.0 | 3.1 | 3.3 |
| M100, MPa | 4.3 | 4.6 | 4.7 | 5.0 | 5.2 |
| M200, MPa | 7.8 | 8.1 | 8.4 | 8.4 | 8.5 |
| TS, MPa | 11.8 | 12.0 | 12.3 | 12.4 | 12.6 |
| EB, % | 290 | 289 | 275 | 284 | 279 |
| AngTear, kN/m | 12.5 | 15.2 | 16.2 | 17.8 | 18.8 |

TABLE 11

| | Comparative example | Invention examples | | | | | |
|---|---|---|---|---|---|---|---|
| Additive of Example No. | — | 1 | 15 | 16 | 17 | 43 | 9 | 42 |
| Additive, wt % | — | 2 | 10 | 4 | 2 | 10 | 4 | 20 |
| CNT concentration in rubber, wt % | — | 0.2 | 0.1 | 0.2 | 0.2 | 0.2 | 0.2 | 0.2 |
| Composition of rubber mixture, parts (w/w) | | | | | | | | |
| NR SMR-10 | 80 | 80 | 80 | 80 | 80 | 66 | 80 | 51 |
| BR22 | 20 | 20 | 20 | 20 | 20 | 20 | 20 | 20 |
| CB N234 | 60 | 60 | 60 | 60 | 60 | 60 | 60 | 60 |
| Nytex 4700 | 4 | 0.8 | — | — | 1.4 | 1.4 | — | — |
| ZnO | 3.5 | 3.5 | 3.5 | 3.5 | 3.5 | 3.5 | 3.5 | 3.5 |
| Stearic acid | 2 | 2 | 2 | 2 | 2 | 2 | 2 | 2 |
| 6PPD | 1 | 1 | 1 | 1 | 1 | 1 | 1 | 1 |
| TMQ | 1 | 1 | 1 | 1 | 1 | 1 | 1 | 1 |
| Additive | — | 3.5 | 19 | 7.2 | 3.5 | 17.5 | 7.2 | 36 |
| CBS | 1 | 1 | 1 | 1 | 1 | 1 | 1 | 1 |
| PVI | 0.1 | 0.1 | 0.1 | 0.1 | 0.1 | 0.1 | 0.1 | 0.1 |
| DPG | 0.2 | 0.2 | 0.2 | 0.2 | 0.2 | 0.2 | 0.2 | 0.2 |
| Sulfur | 1.8 | 1.8 | 1.8 | 1.8 | 1.8 | 1.8 | 1.8 | 1.8 |
| Test results for cured rubber | | | | | | | | |
| $\rho_V$, Ohm · m | 0.28 | 0.10 | 0.096 | 0.048 | 0.053 | 0.082 | 0.047 | 0.06 |
| M100, MPa | 3.2 | 3.6 | 3.7 | 4.3 | 4.4 | 4.0 | 4.2 | 3.7 |
| M200, MPa | 9.0 | 9.0 | 9.4 | 9.9 | 10.3 | 9.5 | 10.1 | 9.3 |
| M300, MPa | 16.1 | 16.1 | 16.5 | 17.1 | 17.2 | 16.5 | 17.1 | 16.4 |
| TS, MPa | 27.9 | 26.5 | 28.1 | 28.4 | 28.7 | 28.2 | 28.4 | 28.0 |
| EB, % | 483 | 463 | 478 | 474 | 483 | 476 | 475 | 480 |
| CrTear, kN/m | 107 | 109 | 112 | 122 | 129 | 118 | 125 | 127 |

TABLE 12

| | Comparative example | Invention examples | | | | | |
|---|---|---|---|---|---|---|---|
| Additive of Example No. | — | 1 | 16 | 17 | 17 | 25 | 25 |
| Additive concentration, wt % | — | 2 | 4 | 2 | 3.8 | 4 | 7.6 |
| CNT concentration in rubber, wt % | — | 0.2 | 0.2 | 0.2 | 0.38 | 0.2 | 0.38 |
| Composition of rubber mixture, parts (w/w) | | | | | | | |
| NR SVR-3L | 80 | 80 | 80 | 80 | 80 | 80 | 80 |
| BR CB-24 | 20 | 20 | 20 | 20 | 20 | 20 | 20 |
| CB N330 | 50 | 50 | 50 | 50 | 50 | 50 | 50 |
| ZnO | 3.5 | 3.5 | 3.5 | 3.5 | 3.5 | 3.5 | 3.5 |
| Stearic acid | 2 | 2 | 2 | 2 | 2 | 2 | 2 |
| iPPD | 1 | 1 | 1 | 1 | 1 | 1 | 1 |
| Additive | — | 3.3 | 6.7 | 3.3 | 6.3 | 6.7 | 13.1 |
| CBS | 1 | 1 | 1 | 1 | 1 | 1 | 1 |
| DPG | 0.2 | 0.2 | 0.2 | 0.2 | 0.2 | 0.2 | 0.2 |
| Sulfur | 1.8 | 1.8 | 1.8 | 1.8 | 1.8 | 1.8 | 1.8 |

TABLE 12-continued

|  | Comparative example | Invention examples | | | | | |
|---|---|---|---|---|---|---|---|
| Test results for cured rubber | | | | | | | |
| $\rho_V$, Ohm · m | 2.8 | 1.2 | 0.27 | 0.20 | 0.074 | 0.057 | 0.027 |
| $\rho_S$, Ohm/□ | 6.3E+4 | 6.1E+4 | 4.5E+4 | 1.3E+4 | 1.1E+4 | 4.2E+4 | 1.1E+4 |
| M100, MPa | 3.1 | 3.2 | 3.6 | 3.9 | 4.2 | 4.3 | 5.5 |
| M200, MPa | 8.2 | 8.2 | 8.5 | 9.1 | 8.9 | 9.2 | 10.2 |
| M300, MPa | 14.5 | 14.4 | 14.5 | 15.4 | 14.9 | 15.4 | 15.9 |
| TS, MPa | 27.4 | 26.0 | 27.1 | 26.8 | 25.4 | 27.4 | 27.3 |
| EB, % | 494 | 471 | 498 | 473 | 461 | 476 | 472 |
| CrTear, kN/m | 77 | 73 | 75 | 113 | 103 | 84 | 92 |
| H, Shore A | 64 | 64 | 66 | 66 | 68 | 68 | 73 |

TABLE 13

|  | Comparative examples | | Invention examples | | | | | |
|---|---|---|---|---|---|---|---|---|
| Additive of Example No. | — | 3 | 18 | 19 | 20 | 25 | 26 | 44 |
| Additive, wt % | — | 3 | 3 | 3 | 3 | 3 | 1.5 | 9 |
| CNT concentration in rubber, wt % | — | 0.15 | 0.15 | 0.15 | 0.15 | 0.15 | 0.15 | 0.15 |
| Composition of rubber mixture, parts (w/w) | | | | | | | | |
| NBR | 100 | 100 | 100 | 100 | 100 | 100 | 100 | 86.7 |
| Additive | — | 5.4 | 5.4 | 5.4 | 5.4 | 5.4 | 2.66 | 16 |
| CB N550 | 60 | 60 | 60 | 60 | 60 | 60 | 60 | 60 |
| ZnO | 5.0 | 5.0 | 5.0 | 5.0 | 5.0 | 5.0 | 5.0 | 5.0 |
| Stearic acid | 1.0 | 1.0 | 1.0 | 1.0 | 1.0 | 1.0 | 1.0 | 1.0 |
| DBP | 5.0 | 5.0 | 5.0 | 5.0 | 5.0 | 5.0 | 5.0 | 5.0 |
| iPPD | 1.0 | 1.0 | 1.0 | 1.0 | 1.0 | 1.0 | 1.0 | 1.0 |
| CZ | 0.5 | 0.5 | 0.5 | 0.5 | 0.5 | 0.5 | 0.5 | 0.5 |
| Sulfur | 2.0 | 2.0 | 2.0 | 2.0 | 2.0 | 2.0 | 2.0 | 2.0 |
| Test results for cured rubber | | | | | | | | |
| $\rho_V$, Ohm · m | 79 | 7.8 | 0.34 | 0.38 | 2.1 | 0.29 | 0.42 | 0.8 |
| $\rho_S$, Ohm/□ | 1E+5 | 8.7E+4 | 1E+4 | 1E+4 | 7E+4 | 7E+3 | 2E+4 | 4E+4 |
| M50, MPa | 3.3 | 3.5 | 3.7 | 3.7 | 4.6 | 4.1 | 4.0 | 3.9 |
| M100, MPa | 6.5 | 6.5 | 6.8 | 6.7 | 7.8 | 7.4 | 7.2 | 7.1 |
| M200, MPa | 13.2 | 13.1 | 14.0 | 14.2 | 15.5 | 14.8 | 14.5 | 14.4 |
| M300, MPa | 19.0 | 18.8 | 19.5 | 19.9 | 21.3 | 21.1 | 21.0 | 19.8 |
| TS, MPa | 21.1 | 20.1 | 20.2 | 22.4 | 23.2 | 22.8 | 22.8 | 22.6 |
| EB, % | 354 | 359 | 326 | 359 | 346 | 343 | 330 | 356 |
| AnTear, kN/m | 23.3 | 22.4 | 26.9 | 27.9 | 30.5 | 31 | 29 | 27.4 |

TABLE 14

|  | Comparative examples | | Invention examples | | | | | |
|---|---|---|---|---|---|---|---|---|
| Additive of Example No. | — | 3 | 21 | 22 | 23 | 25 | 29 | 31 |
| Additive, wt % | — | 3 | 3 | 3 | 3 | 3 | 3 | 3 |
| CNT concentration in rubber, wt % | — | 0.15 | 0.15 | 0.15 | 0.15 | 0.15 | 0.15 | 0.15 |
| Composition of rubber mixture, parts (w/w) | | | | | | | | |
| NBR Perbunan 3945 | 100 | 100 | 100 | 100 | 100 | 100 | 100 | 100 |
| Additive | — | 5.76 | 5.76 | 5.76 | 5.76 | 5.76 | 5.76 | 5.76 |
| $SiO_2$ | 55 | 55 | 55 | 55 | 55 | 55 | 55 | 55 |
| ZnO | 10 | 10 | 10 | 10 | 10 | 10 | 10 | 10 |
| Stearic acid | 1.0 | 1.0 | 1.0 | 1.0 | 1.0 | 1.0 | 1.0 | 1.0 |
| Silane, Si69 | 5.0 | 5.0 | 5.0 | 5.0 | 5.0 | 5.0 | 5.0 | 5.0 |
| $TiO_2$ | 10 | 10 | 10 | 10 | 10 | 10 | 10 | 10 |
| iPPD | 1.5 | 1.5 | 1.5 | 1.5 | 1.5 | 1.5 | 1.5 | 1.5 |
| Sulfur | 2.5 | 2.5 | 2.5 | 2.5 | 2.5 | 2.5 | 2.5 | 2.5 |
| MBTS | 1.0 | 1.0 | 1.0 | 1.0 | 1.0 | 1.0 | 1.0 | 1.0 |
| TMTD | 0.2 | 0.2 | 0.2 | 0.2 | 0.2 | 0.2 | 0.2 | 0.2 |
| Test results for cured rubber | | | | | | | | |
| $\rho_V$, Ohm · m | 7E+8 | 2.5E+7 | 5.5E+6 | 1.1E+4 | 9.7E+3 | 510 | 2.4E+3 | 7.5E+3 |
| $\rho_S$, Ohm/□ | 7E+11 | 7E+10 | 7.9E+9 | 2.0E+9 | 5.0E+9 | 1.6E+6 | 2.4E+7 | 4.1E+7 |

TABLE 14-continued

|  | Comparative examples | | Invention examples | | | | | |
| --- | --- | --- | --- | --- | --- | --- | --- | --- |
| M50, MPa | 1.8 | 2.1 | 2.9 | 2.9 | 2.9 | 3.2 | 2.9 | 2.7 |
| M100, MPa | 3.0 | 3.1 | 4.6 | 4.5 | 4.6 | 5.0 | 4.5 | 4.7 |
| M200, MPa | 6.9 | 7.2 | 9.3 | 9.0 | 9.3 | 10.1 | 10.0 | 9.8 |
| M300, MPa | 12.5 | 12.9 | 15.7 | 15.0 | 15.7 | 16.7 | 16.4 | 16.1 |
| TS, MPa | 21.1 | 22.2 | 23.5 | 24.2 | 23.2 | 24.1 | 25.9 | 23.9 |
| EB, % | 502 | 513 | 407 | 427 | 403 | 398 | 430 | 408 |
| AnTear, kN/m | 20.0 | 23.7 | 27.9 | 27.2 | 30.5 | 31.3 | 30.2 | 26.9 |

TABLE 15

|  | Comparative examples | | Invention examples | | | | | |
| --- | --- | --- | --- | --- | --- | --- | --- | --- |
| Additive of Example No. | — | 3 | 32 | 33 | 34 | 39 | 40 | 41 |
| Additive, wt % | — | 6 | 6 | 6 | 6 | 3 | 10 | 10 |
| CNT concentration in rubber, wt % | — | 0.3 | 0.3 | 0.3 | 0.3 | 0.3 | 1 | 1 |
| Composition of rubber mixture, parts (w/w) | | | | | | | | |
| NBR Perbunan 3945 | 100 | 100 | 100 | 100 | 100 | 100 | 100 | 100 |
| Additive | — | 11.9 | 11.9 | 11.9 | 11.9 | 5.76 | 20.7 | 20.7 |
| SiO$_2$ | 55 | 55 | 55 | 55 | 55 | 55 | 55 | 55 |
| ZnO | 10 | 10 | 10 | 10 | 10 | 10 | 10 | 10 |
| Stearic acid | 1.0 | 1.0 | 1.0 | 1.0 | 1.0 | 1.0 | 1.0 | 1.0 |
| Silane, Si69 | 5.0 | 5.0 | 5.0 | 5.0 | 5.0 | 5.0 | 5.0 | 5.0 |
| TiO$_2$ | 10 | 10 | 10 | 10 | 10 | 10 | 10 | 10 |
| iPPD | 1.5 | 1.5 | 1.5 | 1.5 | 1.5 | 1.5 | 1.5 | 1.5 |
| Sulfur | 2.5 | 2.5 | 2.5 | 2.5 | 2.5 | 2.5 | 2.5 | 2.5 |
| MBTS | 1.0 | 1.0 | 1.0 | 1.0 | 1.0 | 1.0 | 1.0 | 1.0 |
| TMTD | 0.2 | 0.2 | 0.2 | 0.2 | 0.2 | 0.2 | 0.2 | 0.2 |
| Test results for cured rubber | | | | | | | | |
| $\rho_V$, Ohm · m | 6.6E+8 | 2.6E+3 | 56 | 59 | 74 | 46 | 2.1E+4 | 1.6E+3 |
| $\rho_S$, Ohm/□ | 7E+11 | 5.6E+7 | 1.6E+4 | 3E+4 | 5.2E+4 | 1.2E+4 | 1.6E+7 | 7E+6 |
| M50, MPa | 1.8 | 2.2 | 3.2 | 3.0 | 3.1 | 3.4 | 2.4 | 2.8 |
| M100, MPa | 3.0 | 3.4 | 4.8 | 4.3 | 4.6 | 4.9 | 3.9 | 4.2 |
| M200, MPa | 6.9 | 7.0 | 8.9 | 8.5 | 8.6 | 9.8 | 7.1 | 8.8 |
| M300, MPa | 12.5 | 11.8 | 14.3 | 13.9 | 14.0 | 15.8 | 12.9 | 13.7 |
| TS, MPa | 21.1 | 20.8 | 25.4 | 24.1 | 24.2 | 25.6 | 24.5 | 23.8 |
| EB, % | 502 | 520 | 407 | 452 | 470 | 446 | 513 | 490 |
| AnTear, kN/m | 20.0 | 23.6 | 27.9 | 27.5 | 28.2 | 34.2 | 28.6 | 29.5 |

TABLE 16

|  | Comp. examples | | Invention examples | | | | |
| --- | --- | --- | --- | --- | --- | --- | --- |
| Additive of Example No. | — | 4 | 9 | 22 | 26 | 27 | 28 |
| Additive, wt % | — | 3.7 | 7.5 | 7.5 | 3.7 | 2.5 | 1.9 |
| CNT concentration in rubber, wt % | — | 0.37 | 0.38 | 0.38 | 0.37 | 0.38 | 0.38 |
| Composition of rubber mixture, parts (w/w) | | | | | | | |
| BR CB-24 | 27 | 27 | 27 | 27 | 27 | 27 | 27 |
| SBR | 100 | 100 | 100 | 100 | 100 | 100 | 100 |
| Additive | — | 9.2 | 19 | 19 | 9.2 | 6.2 | 4.7 |
| SiO$_2$ | 85 | 85 | 85 | 85 | 85 | 85 | 85 |
| Silane TESPT | 6.8 | 6.8 | 6.8 | 6.8 | 6.8 | 6.8 | 6.8 |
| Stearic acid | 2 | 2 | 2 | 2 | 2 | 2 | 2 |
| TDAE oil | 13 | 5 | — | — | 5 | 9 | 11 |
| ZnO | 2.4 | 2.4 | 2.4 | 2.4 | 2.4 | 2.4 | 2.4 |
| iPPD | 3.5 | 3.5 | 3.5 | 3.5 | 3.5 | 3.5 | 3.5 |
| TBBS | 3 | 3 | 3 | 3 | 3 | 3 | 3 |
| Sulfur | 1 | 1 | 1 | 1 | 1 | 1 | 1 |
| DPG | 1.5 | 1.5 | 1.5 | 1.5 | 1.5 | 1.5 | 1.5 |

TABLE 16-continued

| | Comp. examples | | Invention examples | | | | |
|---|---|---|---|---|---|---|---|
| | \multicolumn{7}{c}{Test results for cured rubber} | | | | | | |
| $\rho_V$, Ohm·m | ≥1E+11 | ≥1E+11 | 80 | 140 | 140 | 120 | 240 |
| $\rho_S$, Ohm/□ | ≥1E+12 | 1E+11 | 2E+06 | 7E+06 | 3E+7 | 3E+7 | 6E+7 |
| M50, MPa | 1.4 | 1.6 | 2.6 | 2.4 | 2.3 | 2.4 | 2.2 |
| M100, MPa | 2.6 | 2.9 | 3.8 | 3.7 | 3.9 | 3.6 | 3.4 |
| M200, MPa | 7.0 | 7.1 | 7.5 | 8.5 | 8.6 | 8.3 | 8.1 |
| M300, MPa | 13.3 | 13.2 | 13.4 | 14.6 | 14.9 | 14.0 | 13.8 |
| TS, MPa | 19.2 | 17.5 | 19.2 | 19.6 | 19.6 | 19.5 | 19.2 |
| EB, % | 389 | 365 | 387 | 378 | 370 | 392 | 371 |
| CrTear, kN/m | 30.5 | 32.7 | 36.7 | 52.5 | 46.1 | 44.5 | 42.0 |
| H, Shore A | 58.8 | 65.2 | 65.7 | 72 | 73.8 | 74.0 | 69.5 |

TABLE 17

| | Comp. examples | | Invention examples | | | | |
|---|---|---|---|---|---|---|---|
| Additive of Example No. | — | 4 | 24 | 25 | 25 | 25 | 45 |
| Additive, wt % | — | 3.7 | 7.5 | 3.0 | 5.0 | 7.5 | 22.2 |
| CNT in rubber, wt % | — | 0.37 | 0.38 | 0.15 | 0.25 | 0.38 | 0.38 |
| \multicolumn{8}{c}{Composition of rubber mixture, parts (w/w)} | | | | | | | |
| BR CB-24 | 27 | 27 | 27 | 27 | 27 | 27 | 27 |
| SBR | 100 | 100 | 100 | 100 | 100 | 100 | 54 |
| Additive | — | 9.2 | 19 | 7.5 | 12.6 | 19 | 55.2 |
| SiO$_2$ | 85 | 85 | 85 | 85 | 85 | 85 | 85 |
| Silane TESPT | 6.8 | 6.8 | 6.8 | 6.8 | 6.8 | 6.8 | 6.8 |
| Stearic acid | 2 | 2 | 2 | 2 | 2 | 2 | 2 |
| TDAE oil | 13 | 5 | — | 7 | 3 | — | 5 |
| ZnO | 2.4 | 2.4 | 2.4 | 2.4 | 2.4 | 2.4 | 2.4 |
| iPPD | 3.5 | 3.5 | 3.5 | 3.5 | 3.5 | 3.5 | 3.5 |
| TBBS | 3 | 3 | 3 | 3 | 3 | 3 | 3 |
| Sulfur | 1 | 1 | 1 | 1 | 1 | 1 | 1 |
| DPG | 1.5 | 1.5 | 1.5 | 1.5 | 1.5 | 1.5 | 1.5 |
| \multicolumn{8}{c}{Test results for cured rubber} | | | | | | | |
| $\rho_V$, Ohm·m | ≥1E+11 | ≥1E+11 | 120 | N/D | 1E+5 | 8.0 | 2E+4 |
| $\rho_S$, Ohm/□ | ≥1E+12 | 1E+11 | 3.0E+6 | 2.0E+11 | 9E+9 | 1.2E+6 | 3.0E+8 |
| M50, MPa | 1.4 | 1.6 | 2.8 | 2.1 | 2.6 | 2.7 | 2.5 |
| M100, MPa | 2.6 | 2.9 | 4.1 | 3.4 | 4.1 | 4.3 | 3.9 |
| M200, MPa | 7.0 | 7.1 | 7.7 | 7.8 | 8.8 | 8.9 | 8.3 |
| M300, MPa | 13.3 | 13.2 | 13.1 | 14.1 | 15.5 | 15.1 | 14.4 |
| TS, MPa | 19.2 | 17.5 | 21.4 | 19.5 | 21.2 | 22.0 | 19.8 |
| EB, % | 389 | 365 | 449 | 382 | 388 | 409 | 389 |
| CrTear, kN/m | 30.5 | 32.7 | 77.0 | 45.2 | 68.4 | 68.9 | 53.7 |
| λ, W/(m·K) | 0.181 | 0.180 | 0.196 | 0.190 | 0.192 | 0.198 | 0.194 |
| tan(δ), 0° C. | 0.145 | 0.15 | 0.205 | 0.18 | 0.20 | 0.22 | 0.21 |

INDUSTRIAL APPLICATION

The present invention can be used in production of rubber compounds and provides rubber with enhanced electrical conductivity and physical and mechanical properties.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

PATENT LITERATURE

Patent literature 1: Patent RU 2731635 C
Patent literature 2: Patent EP 2436720 B1
Patent literature 3: Patent RU 2619782 C2
Patent literature 4: Patent RU 2654959 C2
Patent literature 5: Patent RU 2607407 B1

The invention claimed is:

1. An additive to rubber compounds, the additive comprising:
   1 to 20 wt % carbon nanotubes;
   3 to 90 wt % high-viscosity organic rubber; and
   8 to 95 wt % low-molecular-weight organic dispersion medium capable of dissolving the high-viscosity organic rubber (R)
   and selected from the group consisting of (a) oil with flash point of more than 200° C. and kinematic viscosity of less than 1 St at 100° C., (b) a polar solvent with relative dielectric permittivity of more than 5 at 25° C., and (c) an ester or a mixture of more than one esters of aliphatic alcohols with acids selected from the group consisting of (1) phthalic acid, (2) terephthalic acid, (3) sebacic acid, (4) adipic acid, and (5) cyclohexanedicarboxylic acid, wherein at least some of the carbon nanotubes are bundled, and
   wherein a thickness of at least a part of the carbon nanotube bundles is more than 300 nm.

2. The additive of claim 1, further comprising particles of one or more metals from groups 8-11 or their alloys.

3. The additive of claim 1, wherein the additive has a volume resistivity of not more than 2 Ohm·m at a temperature of 25° C.

4. The additive of claim 1, wherein the additive has a viscosity of more than 5 and less than 90 Mooney units at a temperature of 100° C.

5. The additive of claim 1, wherein a viscosity of the additive is characterized by a needle penetration depth of less than 15 mm at a temperature of 25° C. over 5 s at a defined load of 100 g.

6. The additive of claim 1, wherein the high-viscosity organic rubber is any of natural rubber, synthetic isoprene rubbers, styrene butadiene rubber, nitrile butadiene rubber, hydrogenated nitrile butadiene rubber, butadiene rubber or butyl rubber, halobutyl rubber, ethylene propylene rubber, ethylene propylene diene rubber containing ethylene norbornene or dicyclopentadiene as the third monomer, propylene oxide rubber, acrylate rubber, carboxylate rubber, chloroprene rubber, fluoroelastomer, and a mixture of two or more of these rubbers.

7. The additive of claim 1, wherein the high-viscosity organic rubber has a viscosity $ML_{(1+4)}$ of more than 20 Mooney units at 100° C.

8. The additive of claim 1, wherein the dispersion medium is a polar solvent with a relative dielectric permittivity of more than 40 at 25° C.

9. The additive of claim 1, wherein the dispersion medium comprises at least 10 wt % propylene carbonate.

10. The additive of claim 1, wherein the dispersion medium comprises at least 10 wt % 1,2-butylene carbonate, or 2,3-butylene carbonate, or a mixture thereof.

11. The additive of claim 1, wherein more than 25 wt % carbon nanotubes are single-walled or double-walled carbon nanotubes.

12. The additive of claim 1, wherein a ratio of a mass fraction of the carbon nanotubes to a mass fraction of the organic rubber that is bound to the carbon nanotubes is less than 4.

13. The additive of claim 1, wherein the carbon nanotubes have a ratio of intensities of the G/D bands of more than 10 in Raman spectrum at 532 nm.

* * * * *